United States Patent
Dunn et al.

(10) Patent No.: US 10,562,626 B2
(45) Date of Patent: Feb. 18, 2020

(54) TANDEM WING AIRCRAFT WITH VARIABLE LIFT AND ENHANCED SAFETY

(71) Applicants: Robert N. Dunn, Austin, TX (US); Lawrence R. Dunn, Austin, TX (US)

(72) Inventors: Robert N. Dunn, Austin, TX (US); Lawrence R. Dunn, Austin, TX (US)

(*) Notice: Subject to any disclaimer, the term of this patent is extended or adjusted under 35 U.S.C. 154(b) by 0 days.

(21) Appl. No.: 15/933,012

(22) Filed: Mar. 22, 2018

(65) Prior Publication Data

US 2018/0222584 A1 Aug. 9, 2018

Related U.S. Application Data

(63) Continuation of application No. 14/635,221, filed on Mar. 2, 2015, now abandoned.

(60) Provisional application No. 61/947,395, filed on Mar. 3, 2014.

(51) Int. Cl.
| | |
|---|---|
| *B64C 39/08* | (2006.01) |
| *B64C 3/38* | (2006.01) |
| *B64C 3/54* | (2006.01) |
| *B64C 39/10* | (2006.01) |
| *B64C 3/28* | (2006.01) |

(52) U.S. Cl.
CPC ............ *B64C 39/08* (2013.01); *B64C 3/385* (2013.01); *B64C 3/54* (2013.01); *B64C 3/28* (2013.01); *B64C 2039/105* (2013.01)

(58) Field of Classification Search
CPC ... B64C 39/08; B64C 2039/105; B64C 39/10; B64C 3/54; B64C 3/385
See application file for complete search history.

(56) References Cited

U.S. PATENT DOCUMENTS

| | | | | |
|---|---|---|---|---|
| 1,377,414 | A | * 5/1921 | Ecob | B64C 3/385 244/48 |
| 1,738,423 | A | 12/1929 | Covatch | |
| 1,846,992 | A | * 2/1932 | Decker | B64C 3/385 244/7 C |
| 1,891,166 | A | 12/1932 | Leupold | |
| D90,613 | S | 9/1933 | Burnelli | |
| 2,015,150 | A | 9/1935 | Maxwell | |
| 2,141,984 | A | 12/1938 | Hilmy | |
| D164,843 | S | 10/1951 | Burnelli | |
| 2,673,047 | A | 3/1954 | Scarato | |
| 3,666,209 | A | 5/1972 | Taylor | |
| 4,165,058 | A | 8/1979 | Whitener | |

(Continued)

FOREIGN PATENT DOCUMENTS

| | | |
|---|---|---|
| DE | 102006012527 | 9/2007 |
| EP | 0356601 | 3/1990 |

(Continued)

*Primary Examiner* — Magdalena Topolski
(74) *Attorney, Agent, or Firm* — Egan Peterman Enders Huston

(57) ABSTRACT

A tandem wing aircraft having a fore wing, an aft wing, and a middle wing, attached relative to the aircraft and each other such that the middle wing provides a substantial portion of the total lift at landing speeds, and a minimal portion of the total lift at cruise speeds. At cruise speeds, induced drag is minimized, permitting higher speeds, greater fuel efficiency, and/or greater payload. Advantageously, the wing loading at cruise speeds is higher providing better passenger comfort while still providing controllability and safety at landing speeds.

21 Claims, 30 Drawing Sheets

(56) References Cited

U.S. PATENT DOCUMENTS

| | | | |
|---|---|---|---|
| 4,326,686 | A | 4/1982 | Runge |
| 4,390,150 | A | 6/1983 | Whitener |
| 4,482,108 | A | 11/1984 | Sutton |
| 5,769,358 | A | 6/1998 | Hahl et al. |
| 5,813,628 | A | 9/1998 | Hahl |
| 6,047,923 | A | 4/2000 | Lafferty |
| 7,296,529 | B2 | 11/2007 | Lazar |
| D588,976 | S | 3/2009 | Westra et al. |
| 8,083,185 | B2 | 12/2011 | Konings et al. |
| 8,191,820 | B1 | 6/2012 | Westra et al. |
| 8,262,017 | B2 | 9/2012 | Fraser |
| 8,322,650 | B2 | 12/2012 | Kelleher |
| 8,366,050 | B2 | 2/2013 | Odle et al. |
| 2011/0168835 | A1 | 7/2011 | Oliver |
| 2019/0071174 | A1* | 3/2019 | Burigo ................ B64C 29/0033 |

FOREIGN PATENT DOCUMENTS

| | | |
|---|---|---|
| EP | 0976651 | 2/2000 |
| WO | 84/01341 | 4/1984 |
| WO | 03/076266 | 9/2003 |
| WO | 03/080436 | 10/2003 |
| WO | 2013/108999 | 7/2013 |

\* cited by examiner

TANDEM WING AIRCRAFT WITH VARIABLE LIFT AND ENHANCED SAFETY

PRIORITY CLAIM

The present application claims priority to U.S. application Ser. No. 14/635,221, filed Mar. 2, 2015 which claims priority to U.S. Provisional Application No. 61/947,395, filed Mar. 3, 2014.

BACKGROUND OF THE INVENTION

1. Field of the Invention

This invention generally relates to tandem wing aircraft where high speed cruise flight and low speed flight are optimized and, in particular, where a middle wing of the aircraft is mounted and configured for efficient flight.

2. Description of the Related Art

A long list of remedies exists to increase the stability of winged aircraft in flight, and/or to increase the amount of cargo space available for a winged aircraft, and/or to allow a winged aircraft to have variable lift, and/or variable effective wing area, and/or variable wing curvature, and/or to shorten the amount of runway required for takeoff and landing, and/or in other ways to improve the performance of winged aircraft. References directed to addressing such problems include: U.S. Pat. Nos. 4,390,150; 4,165,058; 6,047,923; 8,191,820; and 8,366,050. References listed are incorporated herein by reference.

All airplanes have the conflicting needs of flying at low airspeeds (e.g., during takeoff & landing) and at higher speeds (e.g., during cruising flight). For flight at low air speeds a lower wing loading (i.e., a larger effective wing area and therefore a lower number of pounds of required lift per unit of wing area), is best. A lower wing loading at low speeds is desirable because it corresponds to a low stalling speed, as well as, enabling an aircraft to take off and land at lower speeds. Low wing loadings combined with thick wings enable low takeoff and landing speeds.

A higher wing loading (i.e., a smaller effective wing area and therefore a higher number of required pounds of lift per unit wing area) is desirable at higher speeds. This is true because, at any given angle of attack, as air speed increases wings generate more lift. Therefore a smaller wing can generate the required lift to keep an aircraft in the air at higher speeds. This is desirable because higher wing loading at higher speeds typically results in smoother flight, particularly in turbulence.

Fundamentally, the amount of lift generated is dependent on the total wing area, airfoil shape, and angle of attack of the wing(s). For any given airfoil, speed, and angle of attack, a large effective wing area results in a large amount of lift at low speeds. Therefore, smaller effective wing areas are desirable at higher speeds.

To resolve the conflicting requirements of low speed and high speed flight, aircraft designers typically employ mechanical devices to change wing surface area and wing curvature. These devices are used singly or in combination and all add weight & complexity to the aircraft design.

Examples of mechanical devices employed to change wing curvature and surface area include trailing edge devices. These are mechanical flap designs which mechanically alter the shape of the wing by extending or otherwise changing the trailing edge of the wing. Some examples of trailing edge devices, illustrated in FIG. 1, include Plain flaps 101, Split flaps 102, Slotted flaps 103, and Fowler flaps 104. Other examples include Double-Slotted Fowler Flaps, Junkers Flaps, Gouge Flaps, Fairey-Youngman Flaps, Zap Flaps, and Gurney Flaps, among others.

Other examples of mechanical devices employed to change wing curvature and surface area include leading edge devices: These devices mechanically alter the shape of the wing by extending or otherwise changing the leading edge of the wing. Some examples of leading edge devices, illustrated in FIG. 2, include a fixed leading edge slot 201, a moveable slat 202, and a leading edge flap 203. Other examples include a partial or full span leading edge cuff, Kreuger flaps, a leading edge droop, and Handley-Page Slots, among others.

Other examples of mechanical devices used to change the effective lift of a wing include circulation control devices. Examples of circulation control devices include but are not limited to: vortex generators, blown wing devices, and fan wings. Thus, total wing area producing lift is sometimes affected by mechanical devices. The term "effective wing area" is sometimes used herein to allow for lifting body effects and the change produced by such trailing and leading edge mechanical devices.

All of the approaches described above that are used to vary effective wing area and/or curvature and/or lift add mechanical complexity and/or weight to the wings. Therefore, they reduce the possible payload of the aircraft, and increase the likelihood of faults in manufacture and mechanical failure during flight.

Many of the approaches described above add to the weight of the aircraft resulting in reduced efficiency, greater fuel expenditures, larger engine requirements, etc. Thus, there is a need for a tandem wing aircraft with variable lift, enhanced efficiency, and enhanced safety.

SUMMARY OF THE INVENTION

The problems outlined above are addressed and largely solved with the tandem wing aircraft in accordance with the present invention. Generally speaking, the tandem wing aircraft of the present invention includes a fore wing mounted to the aircraft at an Angle of Incidence (AOI) F; an aft wing mounted to the aircraft at an AOI of A; and a middle wing mounted to the aircraft between the fore and aft wings, and having an effective wing lifting area greater than, equal to, or less than the fore or aft wing, with an AOI of M, which is less than F, and may be greater than, equal to, or less than A. In a preferred embodiment, the effective wing lifting area is greater than the fore or aft wing. In a preferred form, the middle wing AOI of M is selected such that at cruise speeds, an Angle of Attack (AOA) is less than the AOA of the fore or aft wings. In another preferred form, the middle wing AOI of M is approximately parallel to the zero lift line at cruise speeds. In one embodiment, the middle wing is a lifting body while in another embodiment, one or more of the wings includes a mechanical device to change the AOI.

In one embodiment, the tandem wing aircraft of the present invention includes a fore wing; an aft wing; a middle wing; and each wing being mounted to the aircraft at an Angle of Incidence (AOI) such that at cruise speeds, the AOI of the middle wing is approximately zero (0), minimizing lift and drag. Preferably at cruise speeds, the Angle of Attack (AOA) of the middle wing results in zero (0) induced drag and preferably, at landing configuration speeds, the lift generated by the middle wing is greater than the lift generated by the fore wing or the aft wing.

In general, the present invention includes a method of operating a tandem wing aircraft having a fore wing, an aft wing, and a middle wing where the middle wing is positioned between the fore and aft wings and has an effective wing lifting area greater than, equal to, or less than either the fore or aft wing. In a preferred embodiment, the effective wing lifting area is greater than the fore or aft wing. The method broadly includes positioning the middle wing relative to the aircraft such that at cruise speeds, the AOA of the middle wing is approximately zero (0). In some embodiments, the induced drag of the middle wing at cruise speeds is approximately zero (0). In one form, a mechanical device is attached to the middle wing, and is selectable to change the AOA of the middle wing during flight. In another form, a mechanical device is attached to the middle wing, and is selectable to change the wing effective lifting area during flight.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale. For a more detailed description of the various embodiments, reference will now be made to the accompanying drawings, wherein.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
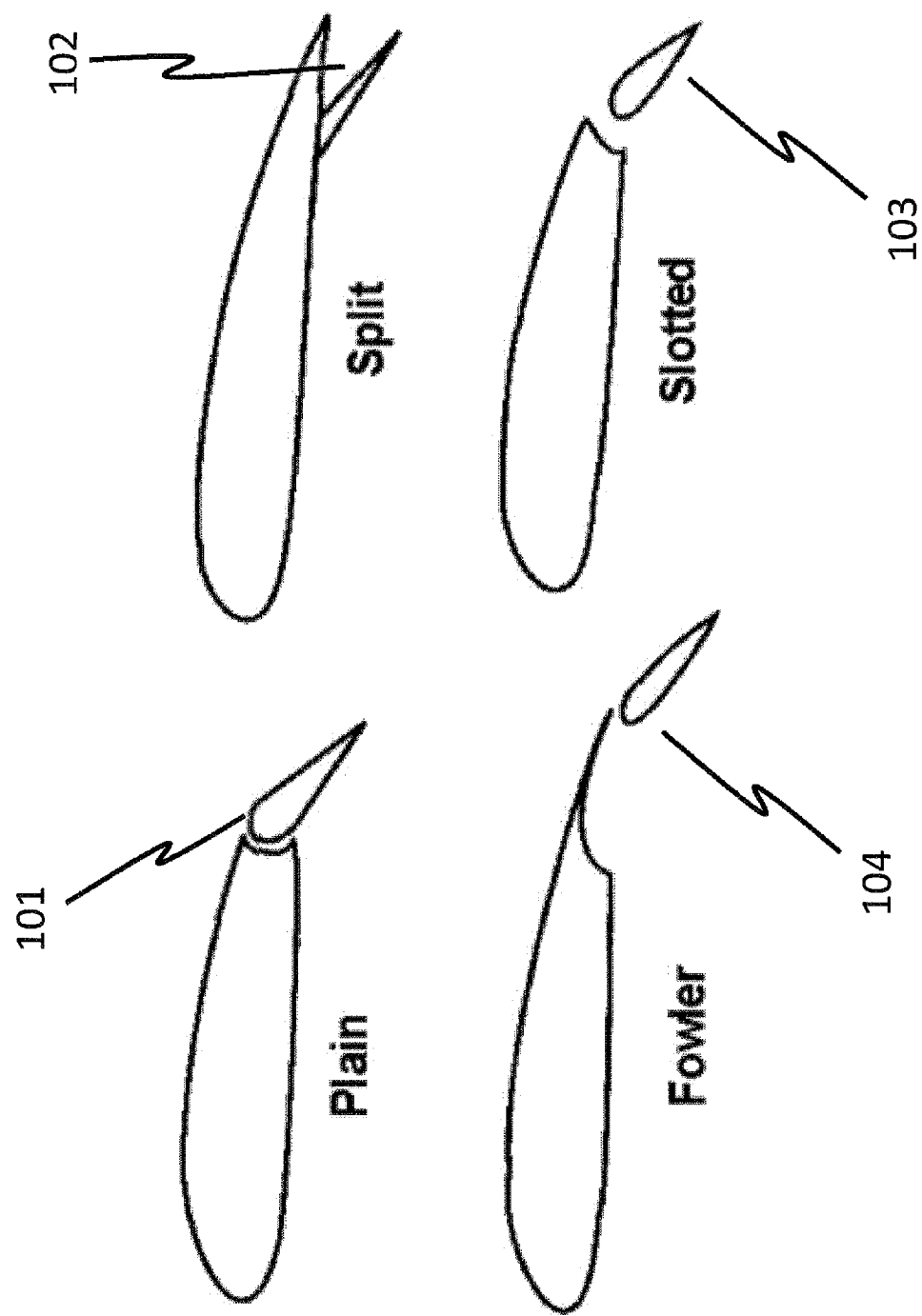
FIG. 1 is a sectional view of aircraft wing and trailing edge flaps.
Figure 2:
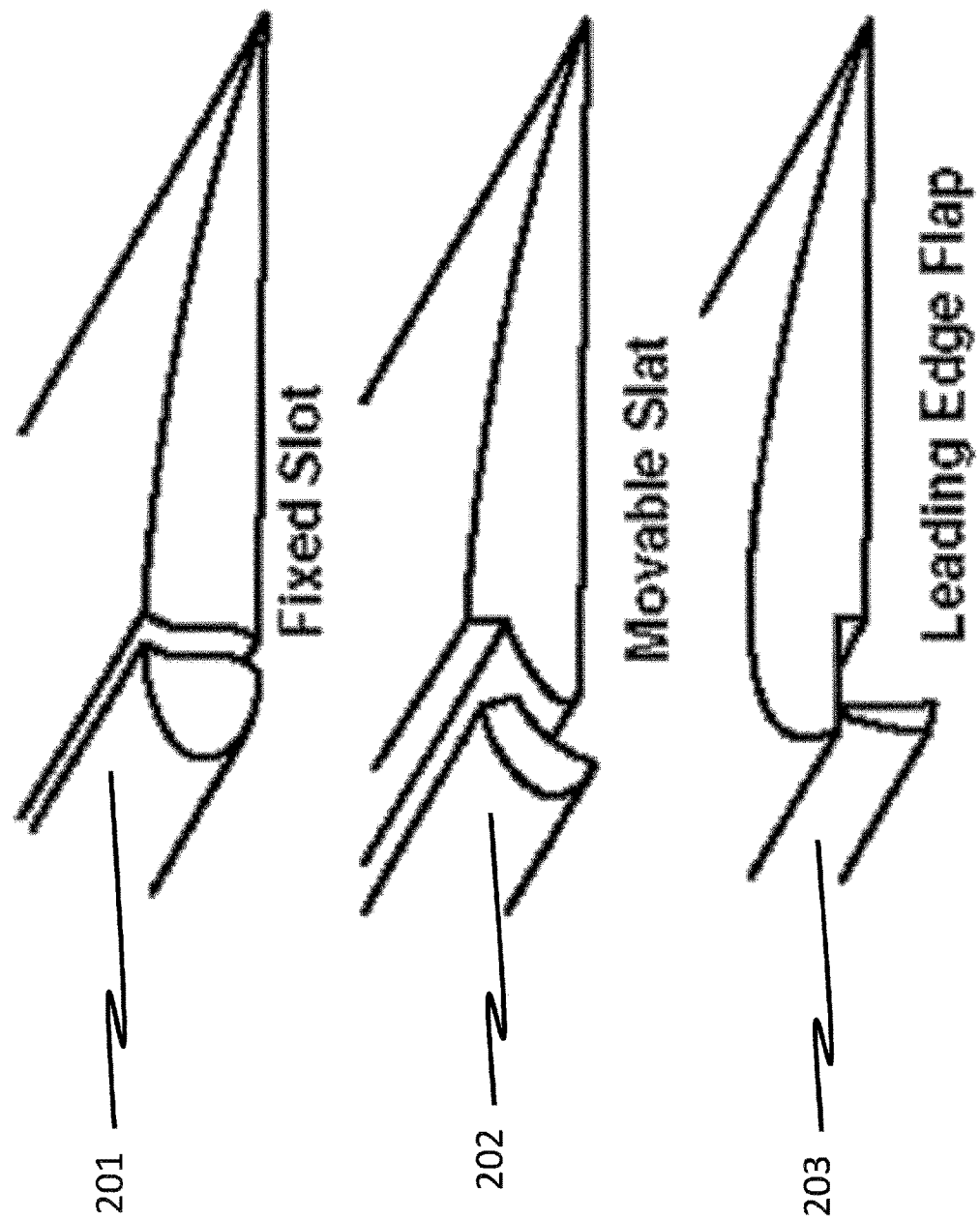
FIG. 2 is a perspective view of wings and leading edge flaps.

The subject matter described herein is directed to an airplane design that allows for high speed and low speed flight regimes by passively varying the relative individual contributions of the fore wing(s) 701, middle wing(s) 702, and aft wing(s) 703 to the total lift of the aircraft. The term "passive" is used herein because the fractions of lift contributed to the total lift by the fore wing(s) 701, middle wing(s) 702, and aft wing(s) 703 are functions of each wing's airfoil(s), airspeed, and angle of attack, and do not require deployment and/or retraction and/or other implementation of mechanical devices, although the subject matter described herein does not preclude the use of such mechanical devices. FIGS. 1-2 illustrate examples of trailing and leading edge mechanical devices.

Figure 3:
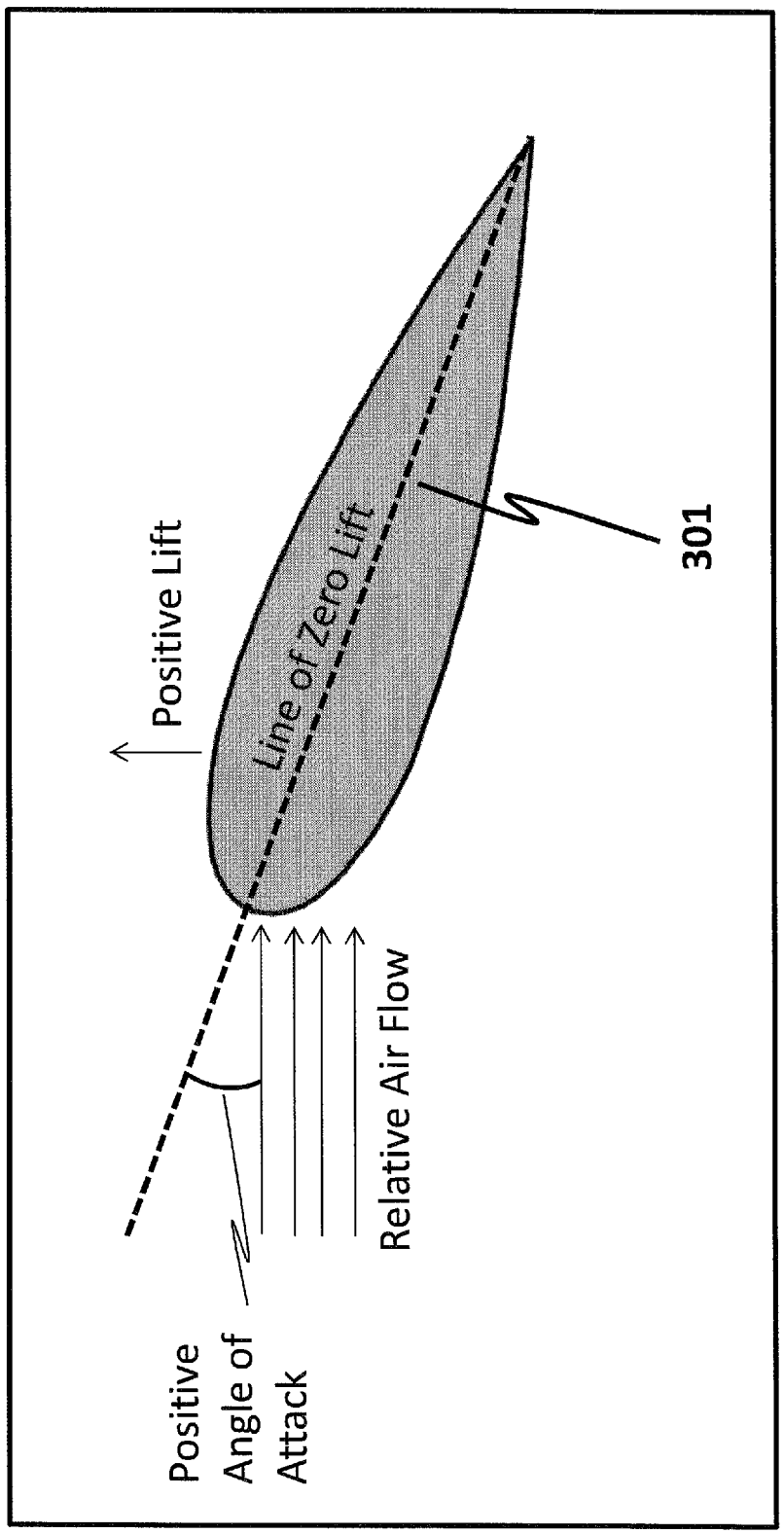
FIG. 3 is a sectional view of a wing with a positive angle of attack relative to the wing's zero lift line.
Figure 4:
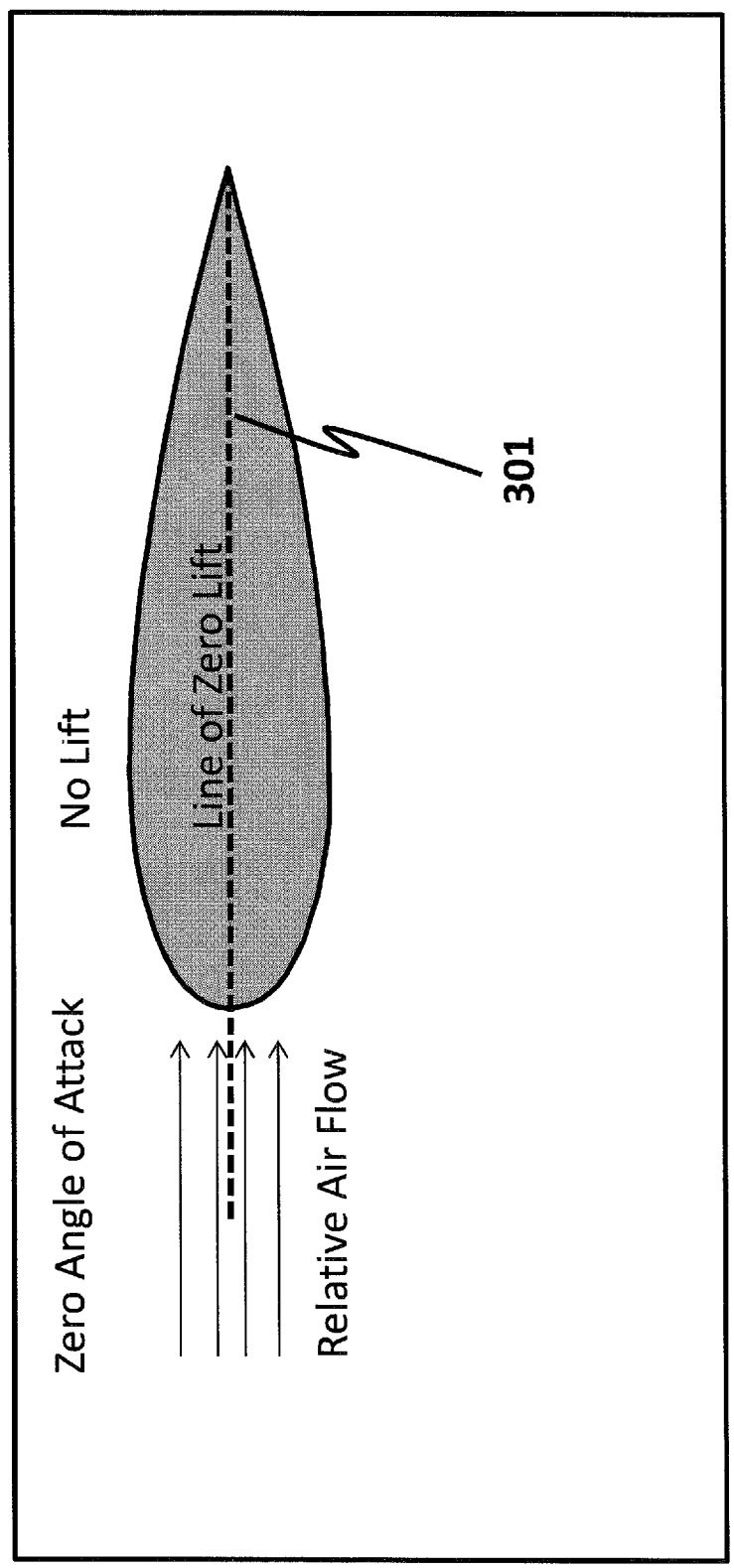
FIG. 4 is a sectional view of a wing with a zero angle of attack relative to the wing's zero lift line, generating zero lift.
Figure 5:
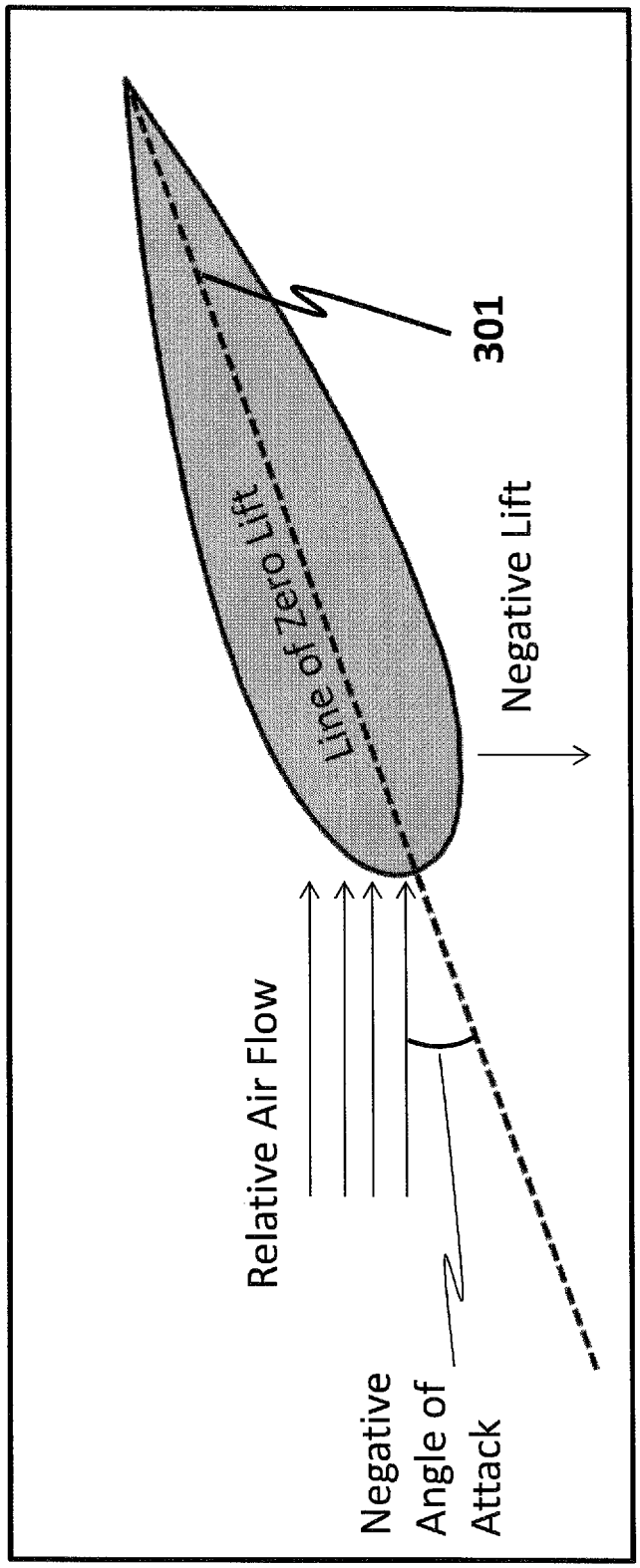
FIG. 5 is a sectional view of a wing with a negative angle of attack relative to the wing's zero lift line, generating negative lift.

The lift of any wing varies as a function of its Angle of Attack (AOA) and airspeed, as illustrated in FIGS. 3-5. The AOA is the angle at which a wing travels through the air, i.e., the angle between the relative wind and a reference line on a wing. For every wing there is an AOA which generates maximum lift (at any airspeed) and another AOA which generates zero lift, known as the Zero Lift Line (ZLL), or Line of Zero Lift 301 (FIG. 3). By way of example, FIG. 3 depicts a wing with a positive angle of attack relative to the wing's zero lift line, generating positive lift, in accordance with some embodiments. In another example, FIG. 4 depicts a wing with a zero angle of attack relative to the wing's zero lift line, generating zero lift, in accordance with other embodiments. In yet another example, FIG. 5 depicts a wing with a negative angle of attack relative to the wing's zero lift line, generating negative lift, in accordance with some embodiments. For wings with symmetric top and bottom halves, the ZLL 301 is always the same as the chord line, which is the line connecting the front most and rear most points of the wing.

A tandem wing aircraft, such as described herein has several advantages over conventional aircraft, which typically have a large single pair of wings and often one or more smaller pairs of aft and/or fore, stabilizer wings. These advantages include:

Greater structural efficiency. This is true in part because the maximum wing loadings of each of the of the three tandem wing pairs are lower than the wing loading of a single wing pair, thus reducing bending moments. Thus, a given payload can be lifted using a lighter, less costly airframe with a larger internal volume.

In some embodiments, flight operations are simplified because there are no mechanical flaps and/or slats requiring actuation when transitioning from a high speed (e.g., cruising) flight regime to a low speed (e.g., take-off or landing) flight regime and vice versa.

In some embodiments, manufacturing is simplified and cost of manufacturing is reduced due to a lower number of parts and greater simplicity of design.

The loading envelope (i.e., the range over which the center of gravity of the air craft can vary while still maintaining aerodynamic control) can be much greater than that of any non-tandem-winged aircraft. Specifically, the loading envelope of the aircraft embodiment shown in FIGS. 9-10 ranges from 120" to 150" aft of the hub of the propeller.

Lower takeoff and landing speeds may be accommodated because the passive increase in lift available from the subject matter described herein can be much greater than the additional lift resulting from extending flaps or slats.

Merely for the sake of clarity, the discussion of the various embodiments described herein is directed to wings having symmetric top and bottom halves (i.e., symmetric wings). However, those of skill in the art in possession of this disclosure will readily understand that the various embodiments described herein may also be directed to wings having asymmetric top and bottom halves (i.e., asymmetric wings).

Figure 6:
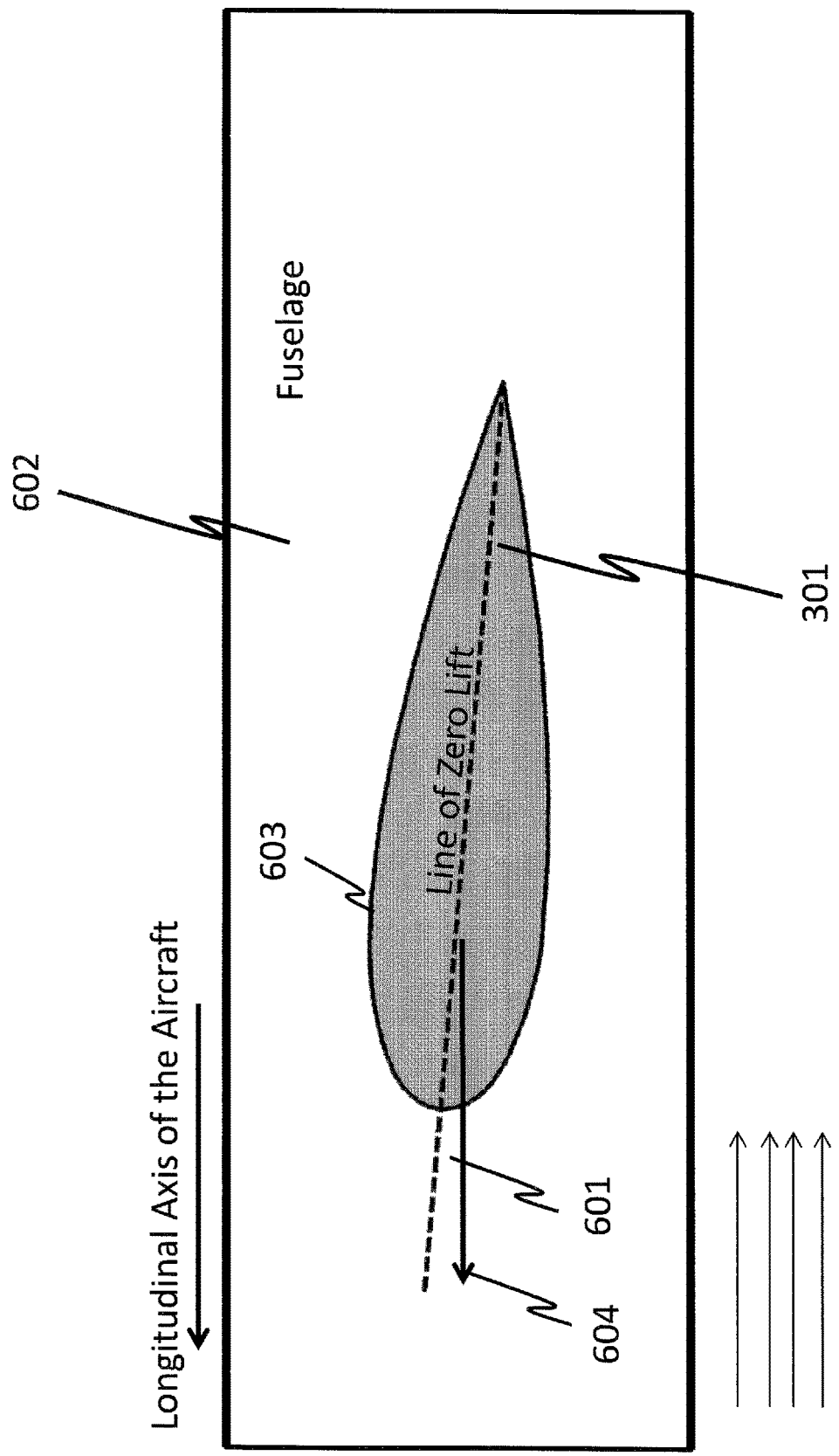
FIG. 6 is a sectional view of a wing.

Referring now to FIG. 6, an airplane wing 603 is shown attached to a fuselage 602 at a positive angle. The difference in angle between the longitudinal axis 604 of the fuselage of aircraft 602 and the mounting angle of the wing is the wing's Angle of Incidence (AOI) 601. As discussed above, typically AOI 601 is positive so that the AOA will be positive to generate lift. In FIG. 6, AOI 601 is the difference between axis 604 and line 301.

Figure 7:
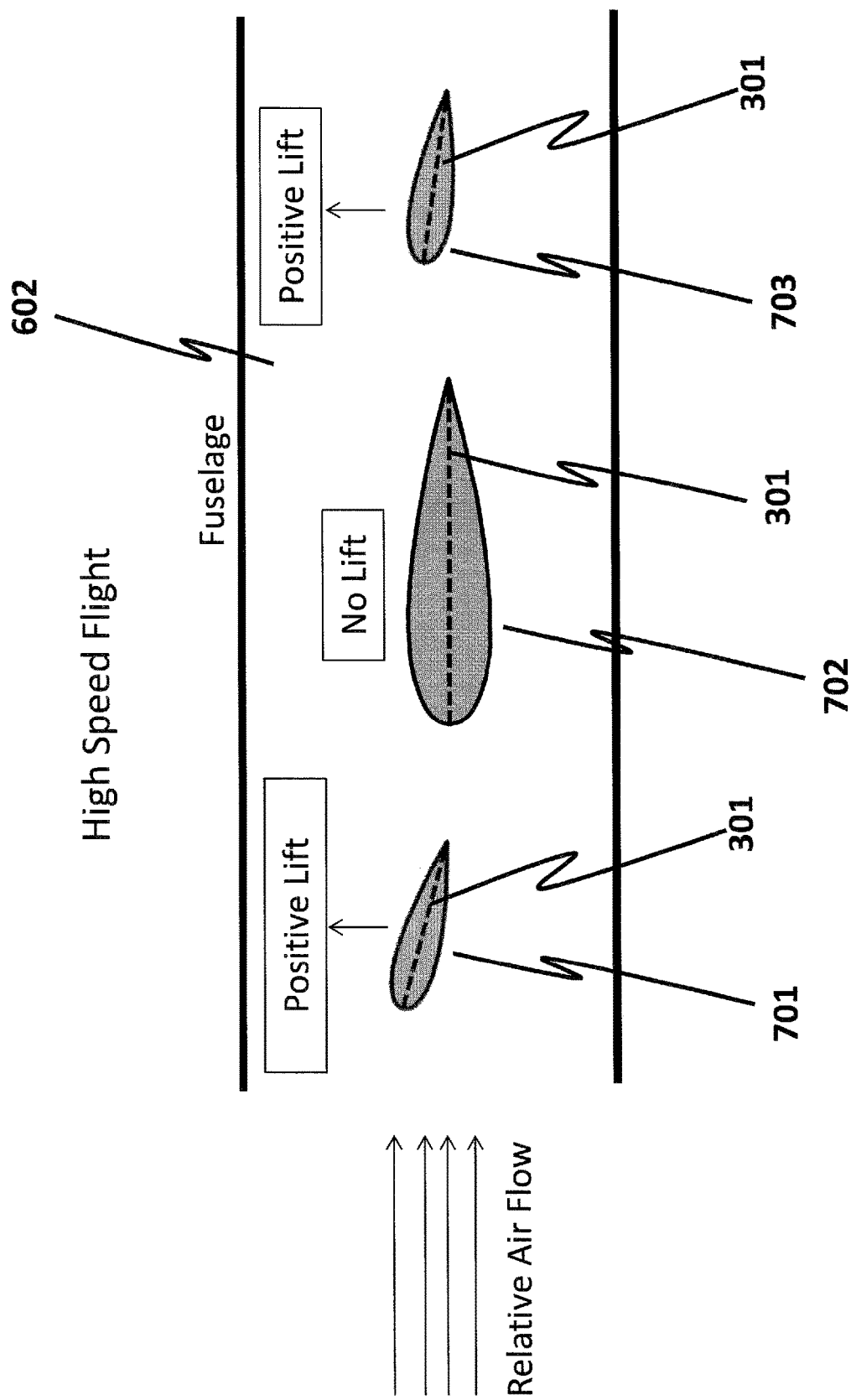
FIG. 7 is a side view of lifting bodies (e.g., wings) of a tandem wing aircraft during high speed flight.
Figure 8:
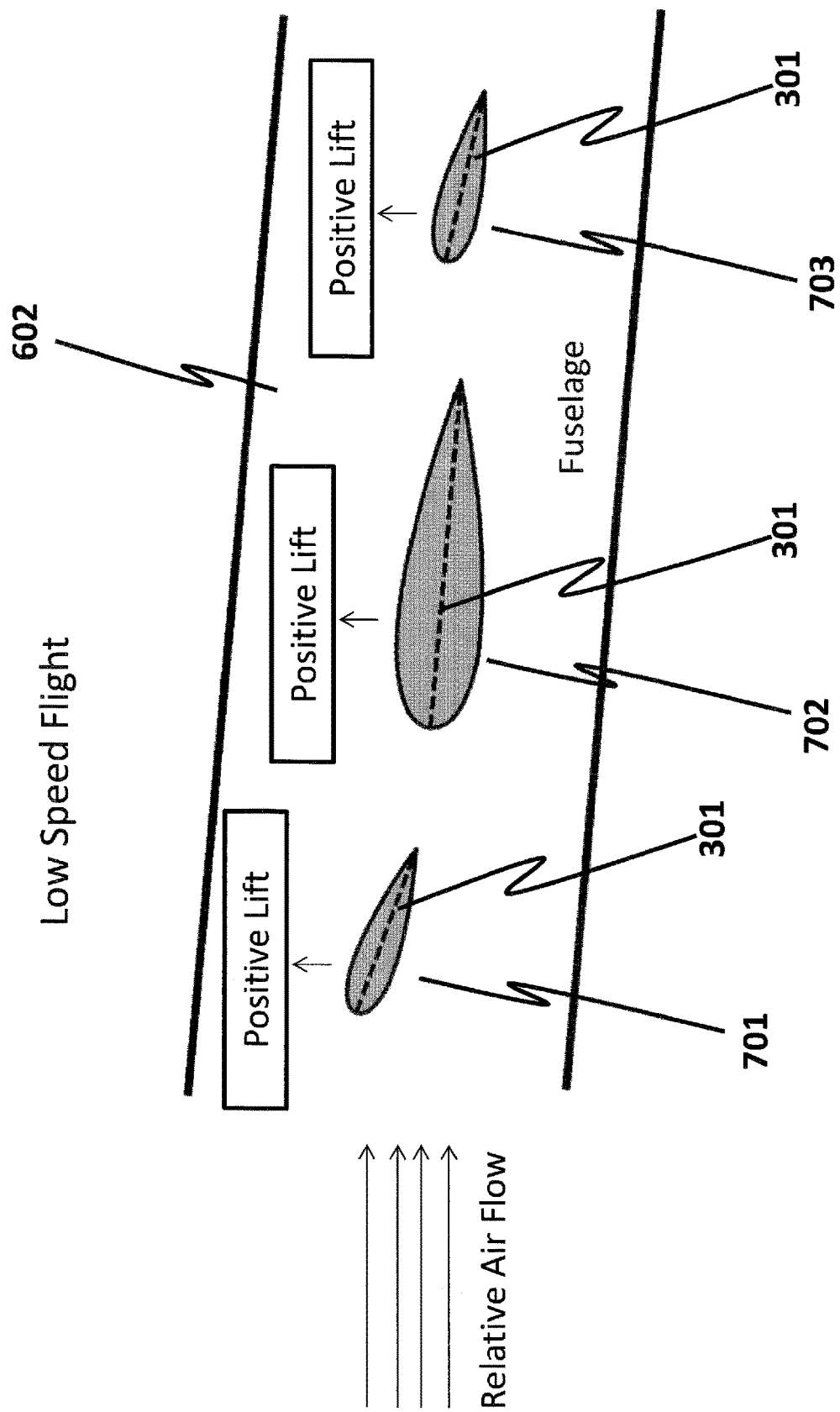
FIG. 8 is a side view of lifting bodies (e.g., wings) of a tandem wing aircraft during low speed flight.

Turning to FIGS. 7-8, various embodiments of the present disclosure consist of an aircraft with three or more wings in tandem configuration (i.e., a tandem wing aircraft). Some embodiments as described herein may include a forewing 701, a middle wing 702, and an aft wing 703. Moreover, in one or more of the present embodiments, any of the three or more wings of the tandem wing aircraft may consist of a wing-body, a blended wing body, or a fuselage-wing combination.

In some embodiments, the middle wing 702 is positioned so that the ZLL 301 is parallel to the longitudinal axis of the aircraft. The relative areas, airfoils, dihedrals, anhedrals, tapers, twists, and sweeps of any of the tandem wings 701/702/703 may vary depending on the intended function(s) of a particular design. For example, these parameters may be drastically different for a large transport plane, an ultralight aircraft, a light plane, or an aircraft designed for supersonic flight.

Figure 9:
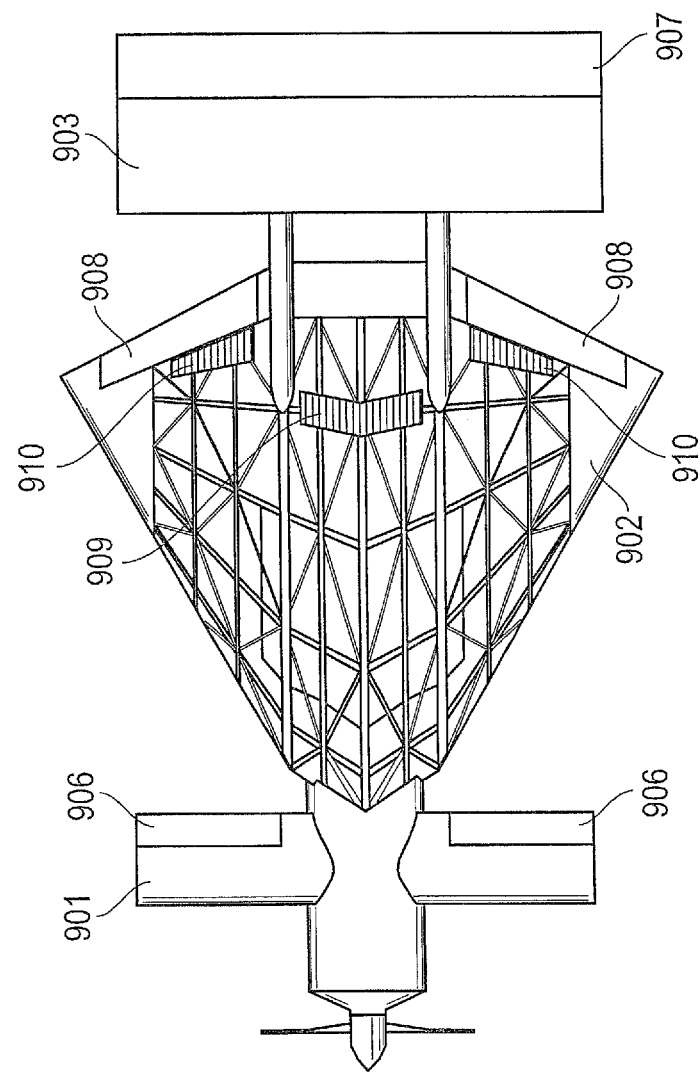
FIG. 9 is a top view of a tandem wing aircraft for which the middle wing takes the form of a winged or lifting body.
Figure 10:
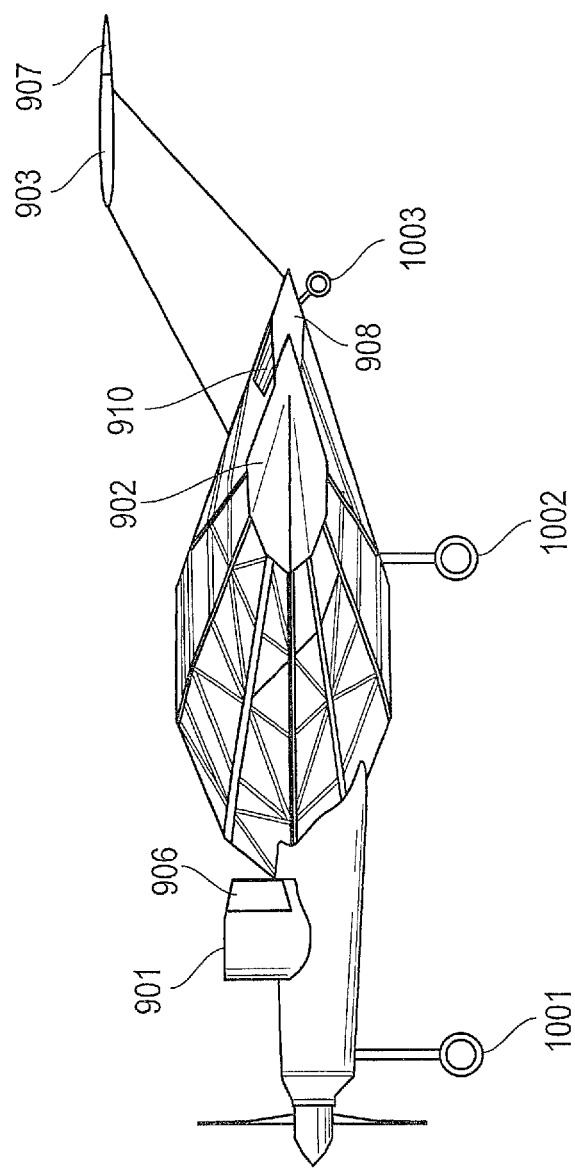
FIG. 10 is a side view of the tandem wing aircraft of FIG. 9.

A top view of an embodiment of a tandem wing aircraft as described herein is shown in FIG. 9, and a side view of an embodiment of the tandem wing aircraft as described herein is shown in FIG. 10. With reference to FIGS. 7-10, the tandem wing aircraft as shown and described includes, in some embodiments, three wings in tandem including a forewing 701, a middle wing 702 (which in the embodiment shown in FIGS. 9-10 is depicted as a wing-body 902), and an aft wing 703. In some embodiments, as illustrated herein, the AOI 601 (FIG. 6) of the forewing 701 and aft wing 703 are always greater than the AOI 601 of the middle wing 702. In other embodiments, the AOI 601 of the aft wing 703 may be more positive or more negative than the AOI 601 of the fore wing 701 and/or middle wing 702.

For purposes of illustration, consider a tandem wing aircraft such as shown in FIGS. 9-10 having a gross weight of 1320 lbs., and powered by Rotax 114UL 115 horse power turbocharged engine. The forewing 901 has a NACA 0024/0012 (root/tip) configuration, an area of 30 ft$^2$, and an angle of incidence of 2.0 degrees. The middle wing 902 has a NACA 0024/0024 (root/tip) configuration, an area of 180 ft$^2$, an angle of incidence of 0.0 degrees. The rear wing 903 has a NACA 0012/0012 (root/tip) configuration, an area of 80 ft$^2$, and an angle of incidence of 0.5 degrees. Of course, the improvements described herein may be applied to aircraft having other power plants, wing chords, wing areas, and other configurations.

In order to maintain constant lift as airspeed increases, the AOAs of the fore wing 701, middle wing 702, and aft wing 703, all decrease. For example, the angle of attack may be controlled through use of the elevators 906 and 907. As this occurs, the fraction of total lift generated by the middle wing 702 decreases. As this process progresses, the amount of lift generated by the middle wing 702 is meant to approach zero. This is true because the AOI 601 of the middle wing 702 is intended to be close to or equal to the wing's ZLL 301 at high speeds.

In order to maintain constant lift as airspeed decreases, the AOAs of the fore wing 701, middle wing 702, and aft wing 703 all increase. For example, the angle of attack may be controlled through use of the elevators 906 and 907. As this occurs, the fraction of total lift generated by middle wing 702 increases. As this process progresses, the amount of lift generated by middle wing 702 is meant to reach an appreciable non-zero fraction of the total lift of the aircraft, and in some embodiments may exceed the lifts contributed by fore wing 701 and aft wing 702.

Under the conditions of high speed flight described above, the forewing 701 and aft wing 703 provide the lift to keep the aircraft aloft, in the same fashion as two men carrying a stretcher. This is accomplished by adjusting the trims of the fore wing 701 and aft wing 703 so as to keep the angle of attack of the middle wing 702 as close to the zero lift line 301 of the wing as possible.

To demonstrate the performance of the aircraft described herein, computational simulations were performed using X-Plane, an aircraft design and flight simulation software tool developed by Laminar Research, Inc. References describing the X-Plane software tool, its effectiveness, and capabilities include:

Laminar Research (2015), X-Plane Flight Simulator, http://www.x-plane.com/desktop/home/.

Craighead, Jeff, et al., "A survey of commercial & open source unmanned vehicle simulators," Robotics and Automation, 2007 IEEE International Conference.

Ribeiro, Lucio R., et al., "UAV autopilot controllers test platform using Matlab/Simulink and X-Plane," 40th ASEE/IEEE Frontiers in Education Conference, 2010.

Gimenes, Ricardo, et al., "Flight Simulation Environments Applied to Agent-Based Autonomous UAVS," ICEIS (4), 2008.

Garcia, Richard et al., "Multi-UAV simulator utilizing X-Plane," Selected papers from the 2nd International Symposium on UAVs, 2009.

As a means of confirming the change in lift generated by the forewing 701, middle wing 702, and aft wing 703, as a function of air speed and AOA, computational simulations using X-Plane was performed on the aircraft shown in FIGS. 9-10. The simulations used the aircraft's maximum gross weight of 1320 lbs, with the center of gravity of the aircraft 132" aft of the hub of the propeller, with the AOI of the forewing 701 equal to 2.0 degrees, the AOI of the middle wing 702 equal to 0.0 degrees, and with the AOI of the aft wing 703 equal to 0.5 degrees.

For the simulation results depicted in FIGS. 11-17, the aircraft's engine power was quickly reduced from 100% to 0%, and the aircraft's altitude above sea level 1101 was maintained near 10,000 feet, requiring the aircraft's true air speed 1102 to decrease in order to maintain constant altitude.

Figure 12:
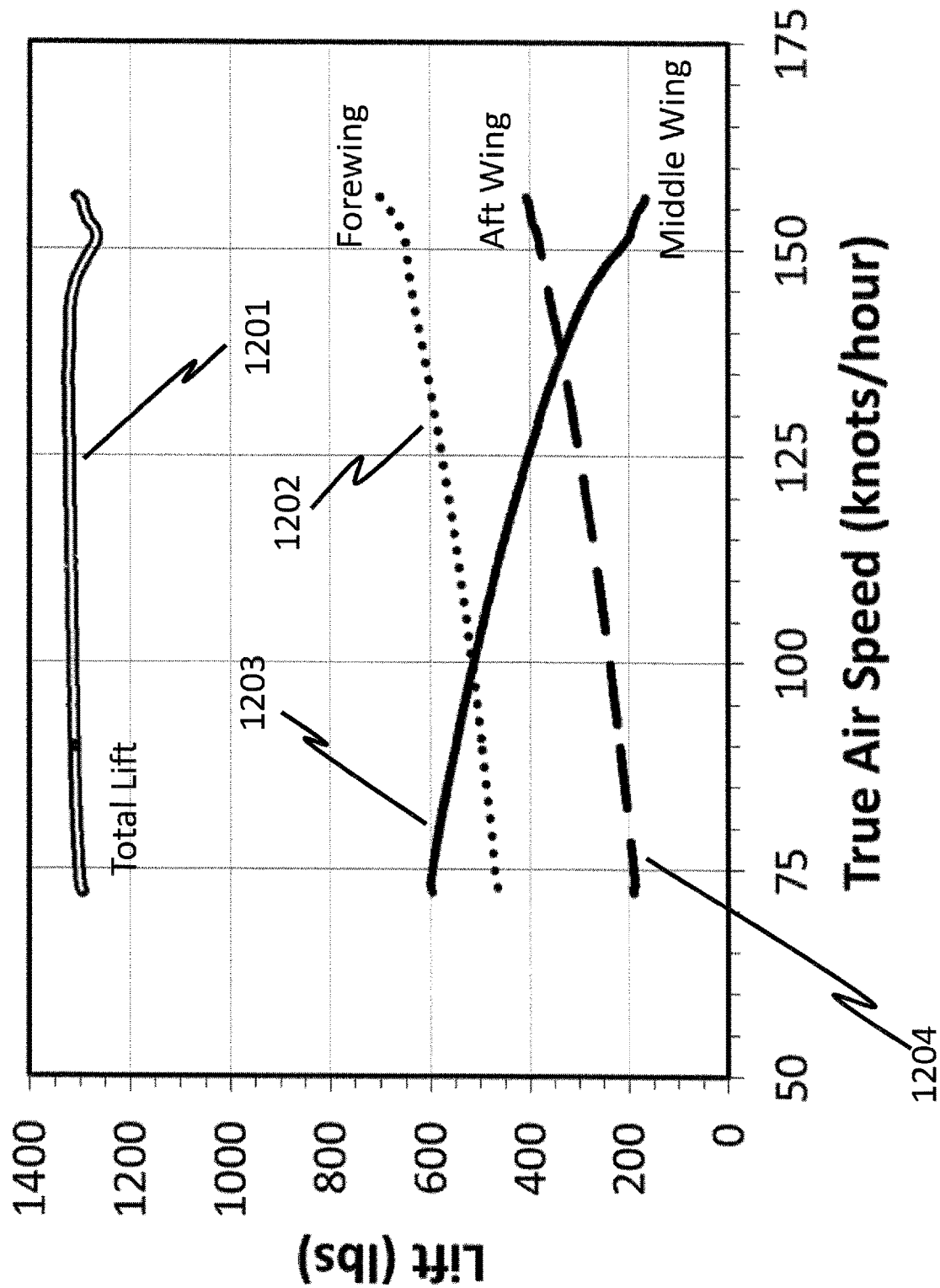
FIG. 12 is a plot of data derived from computational simulations performed with X-Plane, where the total lift generated and lift generated by each of the three wings is a function of true air speed.
Figure 13:
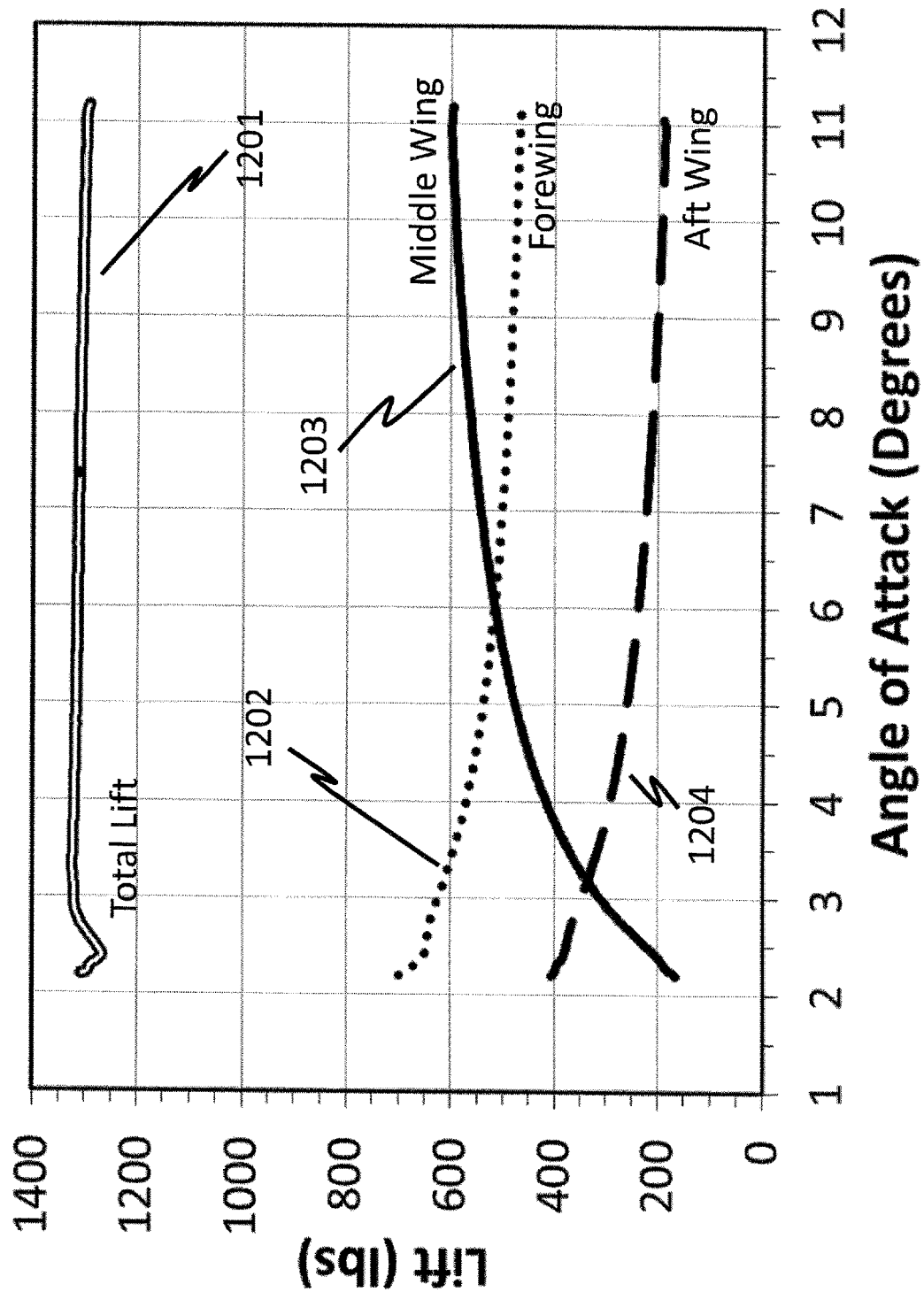
FIG. 13 is a plot of data derived from computational simulations performed with X-Plane, where the total lift generated and lift from each of the three wings is a function of angle of attack.

FIGS. 12-13 demonstrate that as the aircraft's true air speed 1102 decreases, and the AOA of the aircraft increases, the total lift 1201 generated remains approximately constant, the lift generated by the forewing 1202 and lift generated by the aft wing 1204 both decrease, and the lift generated by the middle wing 1203 increases.

In the embodiment of the subject matter shown in FIGS. 9 and 10, the trims of the fore wing 701 and aft wing 703 are adjusted by manipulating the elevators 906 and 907 on the fore wing 701 and aft wing 702 as needed. In other embodiments the trims of relevant wings may be adjusted using trim tabs and/or servo tabs and/or anti-servo tabs and/or stabilizers and/or stabilators, and/or jack screws, and/or other mechanisms to keep the AOA of the wing or wings intended to contribute little or no lift at high speeds at or near their respective ZLLs.

For some embodiments of the subject matter disclosed herein the AOI 601 of the aft wing 703 may be greater than, equal to, or less than AOI of the middle wing 702, depending on the location of the center of gravity of the airplane. See, e.g., FIGS. 4-8.

For an embodiment of the aircraft shown in FIGS. 9-10, a pilot in control of the aircraft may always enter into a low-speed controlled descent with an AOA 2603 (shown in FIGS. 26-27) of approximately 65 degrees, a true air speed 2503 (shown in FIG. 25) in the range of 45 to 55 knots/hour, an indicated air speed 2504 (shown in FIG. 25) in the range of 20 knots/hour, and a vertical air speed 2802 (shown in FIG. 28) in the range of −4000 to −3000 ft/min. This maneuver may be accomplished from any initial attitude of the aircraft, and from any initial indicated airspeed less than 300 knots/hour, and at any power setting from 0% to 100%, and any center of gravity within the loading fore and aft loading limits of 120" to 150" from the hub of the propeller, by simply executing a full pitch up of the elevators 906 and 907 and closing the throttle, and maintaining neutral positions of the ailerons 908 and rudders 1004 throughout. In other words, by executing this maneuver, the aircraft will always right itself. Thus this embodiment may always allow emergency descents at survivable forward air speeds. This embodiment may also allow ballistic aircraft parachutes to be deployed at speeds within the operating requirements of those parachutes.

As a means of confirming this, computational simulations were carried out in X-Plane of the embodiment of the aircraft shown in FIGS. 9-10, at the aircraft's maximum gross weight of 1320 lbs, with the center of gravity of the aircraft 132" aft of the hub of the propeller, with the AOI 601 of the forewing 701 equal to 2.0 degrees, the AOI 601 of the middle wing 702 equal to 0.0 degrees, and with the AOI 601 of the aft wing 703 equal to 0.5 degrees.

For the simulation results depicted in FIGS. 25-30, a deliberate stall was unsuccessfully attempted by increasing the AOA 2603 (shown in FIGS. 26-27) of the aircraft until it reached >90 degrees, and until the indicated air speed 2504 (shown in FIG. 25) reached ~0 knots/hour. Following this point, the aircraft entered into a tail slide with the elevators 906 and 907 still maintained at maximum deflection, causing the front of the aircraft to pitch down until the aircraft reached an AOA 2603 of approximately 65 degrees, after which a stable controlled descent to ground was maintained with a true air speed 2503 (shown in FIG. 25) in the range of 45 to 55 knots/hour, an indicated air speed 2504 (shown in FIG. 25) in the range of 20 knots/hour, and a vertical air speed 2802 (shown in FIG. 28) in the range of −4000 to −3000 ft/min. During this entire maneuver, maximum pitch-up of the elevators 906 and 907 was maintained, and the ailerons 908 and rudders 1004 were maintained in their neutral positions.

The design described herein may be embodied by any size or type of heavier-than-air aircraft. Example embodiments include, but are not limited to: pilotless drones, ultralights, light sport aircraft, light planes, seaplanes, float planes, amphibious planes, passenger planes, commercial airliners, cargo planes, military fighter aircraft, military transport aircraft, flying cars, planes designed for supersonic flight, and/or space planes.

Various embodiments of the disclosure may be fabricated with various materials, including, but not limited to: wood, metal, and composite materials such as carbon fiber and epoxy resins.

The subject matter described herein may be embodied by aircraft with any type of propulsion system, including but not limited to: motors powered by hydrocarbon fuels (including gasoline, diesel, jet fuel, etc.), battery-powered electric motors, prop engines, solar-powered electric motors, other combustion systems, rockets, nuclear-powered motors, jet engines, and/or hybrid combinations.

Additionally, if a wing-body configuration is chosen for one or more of the wings, as is depicted in the embodiment shown in FIGS. 9-10, the internal volume can be much greater than that of a traditional aircraft with a fuselage. This could result in enhanced cargo space and/or passenger comfort.

Additionally, if a wing-body configuration is chosen for one or more of the wings, as is depicted in the embodiment shown in FIGS. 9-10, the external surface area can be much greater than that of a traditional aircraft with a fuselage. This could result in enhanced ability to harvest solar energy through, e.g., photovoltaic devices. Potential applications of this solar energy harvesting may be to charge electric batteries and/or to power electric motors.

Additionally, the disclosure may be embodied by a design for which the overall drag during high speed flight of the aircraft is less than that of a conventionally designed aircraft (i.e., with mechanical flaps and/or slats) of equal weight, thus resulting in improved fuel and/or other efficiencies. Nevertheless, any of the approaches and/or mechanical devices described above, or in other prior art, which may be used to mechanically vary effective wing area and/or curvature and/or lift (i.e., with mechanical flaps, slots, and/or slats) may be combined and/or otherwise incorporated with the subject matter described herein.

In the embodiment shown in FIGS. 9-10, spoilers 909/910 are also shown. The spoilers are deployed (i.e. raised) to reduce lift, increase drag, and encourage descent. In other embodiments mechanical spoilers may be included on all relevant wings to reduce lift, increase drag, and encourage descent.

In alternative embodiments of the subject matter disclosed herein, the landing gear 1001, 1002, 1003 is intended to be fully or partially retractable.

In alternative embodiments of the subject matter disclosed herein, a portion of the high volume payload and structural strength of the aircraft allows for the use of one or more aircraft parachutes that may be deployed in the event of an emergency. In this case, relatively small parachutes may be used, because the large total wing area of the aircraft generates significant amounts of lift at speeds below that of the takeoff and landing speeds (see FIGS. 25-30). In some embodiments, at positive AOA's and at air speeds greater than zero, but below their respective stalling speeds, the forewing(s) 701, middle wing(s) 702, and aft wing(s) 703 are able to generate considerable lift, and the deployment of lift generating device(s) including, but not limited to ram-air parachute(s), may sufficiently augment the lifts of the tandem wings to allow emergency descents at survivable forward air speeds.

In alternative embodiments of the subject matter disclosed herein, the forewing(s) 701, and aft wing(s) 703 may be at any longitudinal distance from the middle wing(s) 702 of the aircraft.

In alternative embodiments of the subject matter disclosed herein, the forewing(s) 701, middle wing(s) 702 and aft wing(s) 703 may be located any distance above, below or on the longitudinal centerline of the aircraft. In alternative embodiments of the subject matter disclosed herein, the middle wing(s) 702 may be designed so as to be able to retract and/or pivot in flight for the purpose of reducing drag. In alternative embodiments of the subject matter disclosed herein, the AOI 601 of the forewing(s), middle wing(s), and aft wing(s) may be adjustable at any time, including during flight, through the use of jack screw mechanisms, and/or by other mechanisms.

In alternative embodiments of the subject matter disclosed herein, the forewing(s) 701, middle wings(s) 702, and aft wing(s) 703 may able to retract and/or fold and/or pivot to facilitate storage on land, on water or within an enclosed volume such as a ship or airplane hangar.

In the embodiment of the subject matter shown in FIGS. 9-10, the aircraft is constructed with geodesic truss frames. Aircraft constructed with geodesic truss frame construction are more resistant to catastrophic structural failure(s) due to the presence of multiple additional load paths as compared to aircraft fabricated with other construction techniques.

In the embodiment of the subject matter shown in FIGS. 9-10, pressurized vessel(s) may be used inside the winged body 902, or in other sections of the aircraft, to maintain pressure near atmospheric pressure while the aircraft is at high altitude. Maintaining only a portion of the internal volume of the aircraft near atmospheric pressure may allow for costs associated with aircraft fabrication and operation. Maintaining sections of the internal volume of the aircraft near atmospheric pressure may increase the safety of the aircraft by separating the pressure vessel from the air frame itself.

One advantage of the various embodiments discussed above, including the embodiment shown in FIGS. 9-10, is that at high G-force loading, the total lift of the aircraft is distributed over the three wings, with the highest wing loading occurring for the forewing, and the lowest wing loading occurring for the aft wing.

In FIGS. 11-30, all of the data shown corresponds to data calculated from computational simulations performed with X-Plane of an embodiment of the aircraft shown in FIGS. 9-10, at the aircraft's maximum gross weight of 1320 lbs., with the center of gravity of the aircraft 132" aft of the hub of the propeller, with the AOI of the forewing 701 equal to 2.0 degrees, the AOI of the middle wing 702 equal to 0.0 degrees, and with the AOI of the aft wing 703 equal to 0.5 degrees.

FIGS. 11-17 are 1 G Constant altitude plots, showing the results of X-Plane simulation for various conditions as shown. In FIGS. 11-17, the conditions are for an aircraft at 100% power at 10 k feet. Then, the power is cut, and the aircraft is programmed to maintain altitude. The air speed decreases and angle of attack increases until the aircraft can no long maintain altitude. At that point the simulation ends.

Figure 11:
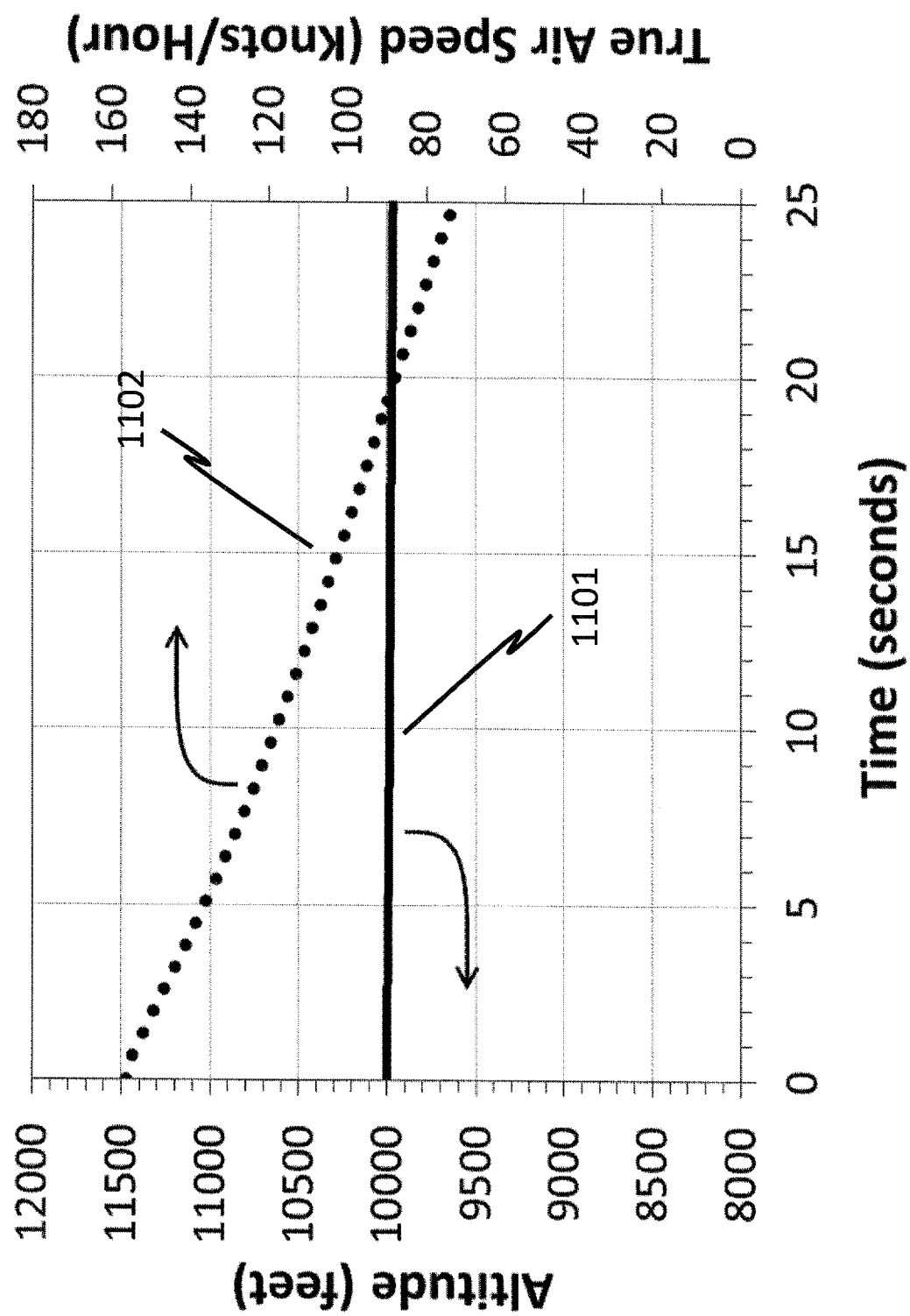
FIG. 11 is a plot of data derived from computational simulations performed with X-Plane, where the altitude and true air speed is a function of time.

FIG. 11 depicts a plot of the altitude and true air speed as a function of time, calculated from a computational simulation performed with X-Plane, of a tandem wing aircraft depicted in FIGS. 9-10, during which the aircraft's engine power was quickly reduced from 100% to 0%, and the aircraft's altitude was maintained near 10,000 feet.

FIG. 12 depicts a plot of total lift generated and lift generated by each of the three wings as a function of true air speed, calculated from a computational simulation performed with X-Plane, of the tandem wing aircraft depicted in FIGS. 9-10, during which the aircraft's engine power was quickly reduced from 100% to 0%, and the aircraft's altitude was maintained near 10,000 feet.

FIG. 13 depicts a plot of total lift generated and lift from each of the three wings as a function of angle of attack, calculated from a computational simulation performed with X-Plane, of the tandem wing aircraft depicted in FIGS. 9-10, during which the aircraft's engine power was quickly reduced from 100% to 0%, and the aircraft's altitude was maintained near 10,000 feet.

Figure 14:
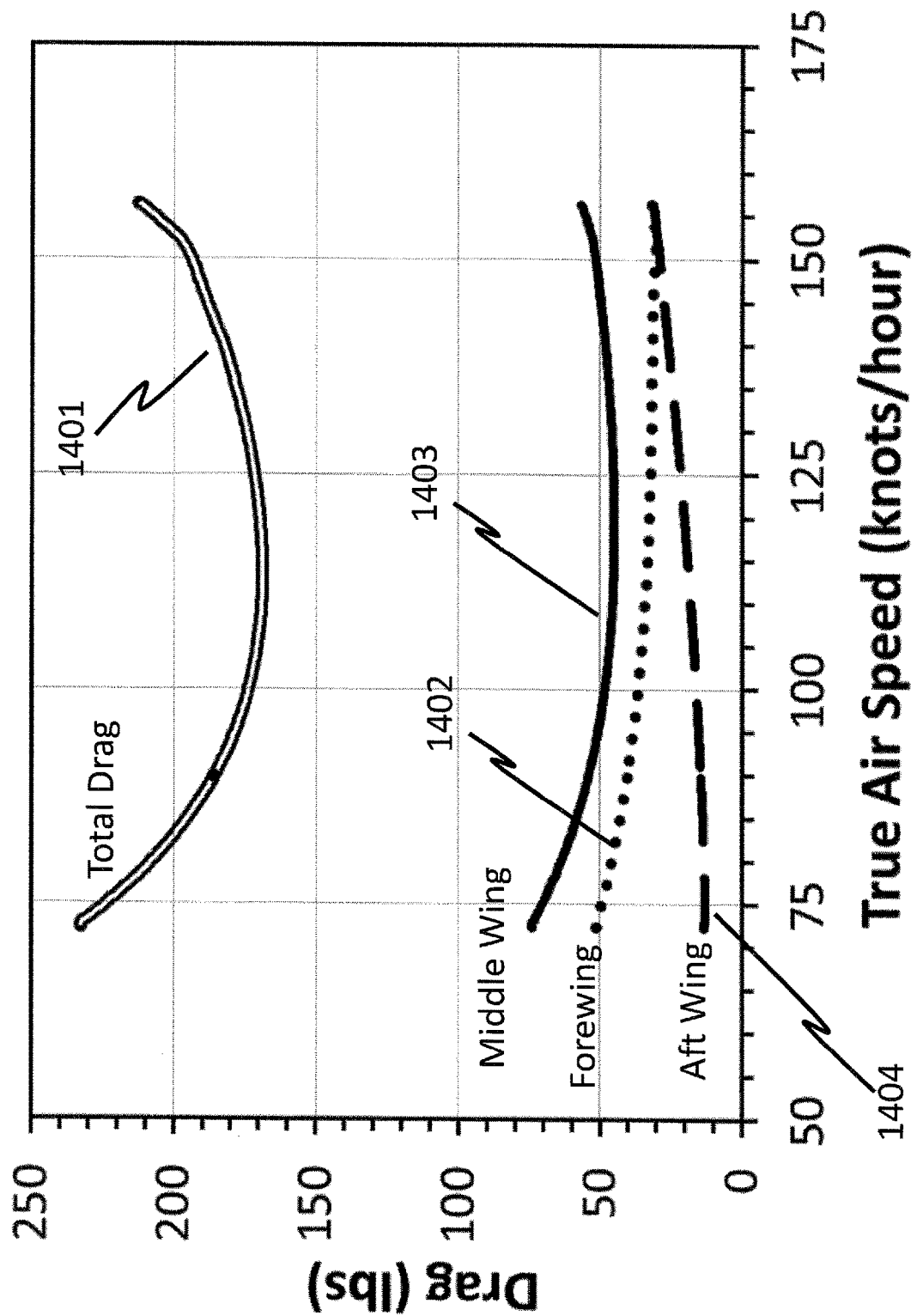
FIG. 14 is a plot of data derived from computational simulations performed with X-Plane, where the total drag generated, and drag generated by each of the three wings is a function of true air speed.

FIG. 14 depicts a plot of total drag generated, and drag generated by each of the three wings as a function of true air speed, calculated from a computational simulation performed with X-Plane, of the tandem wing aircraft depicted in FIGS. 9-10, during which the aircraft's engine power was quickly reduced from 100% to 0%, and the aircraft's altitude was maintained near 10,000 feet.

Figure 15:
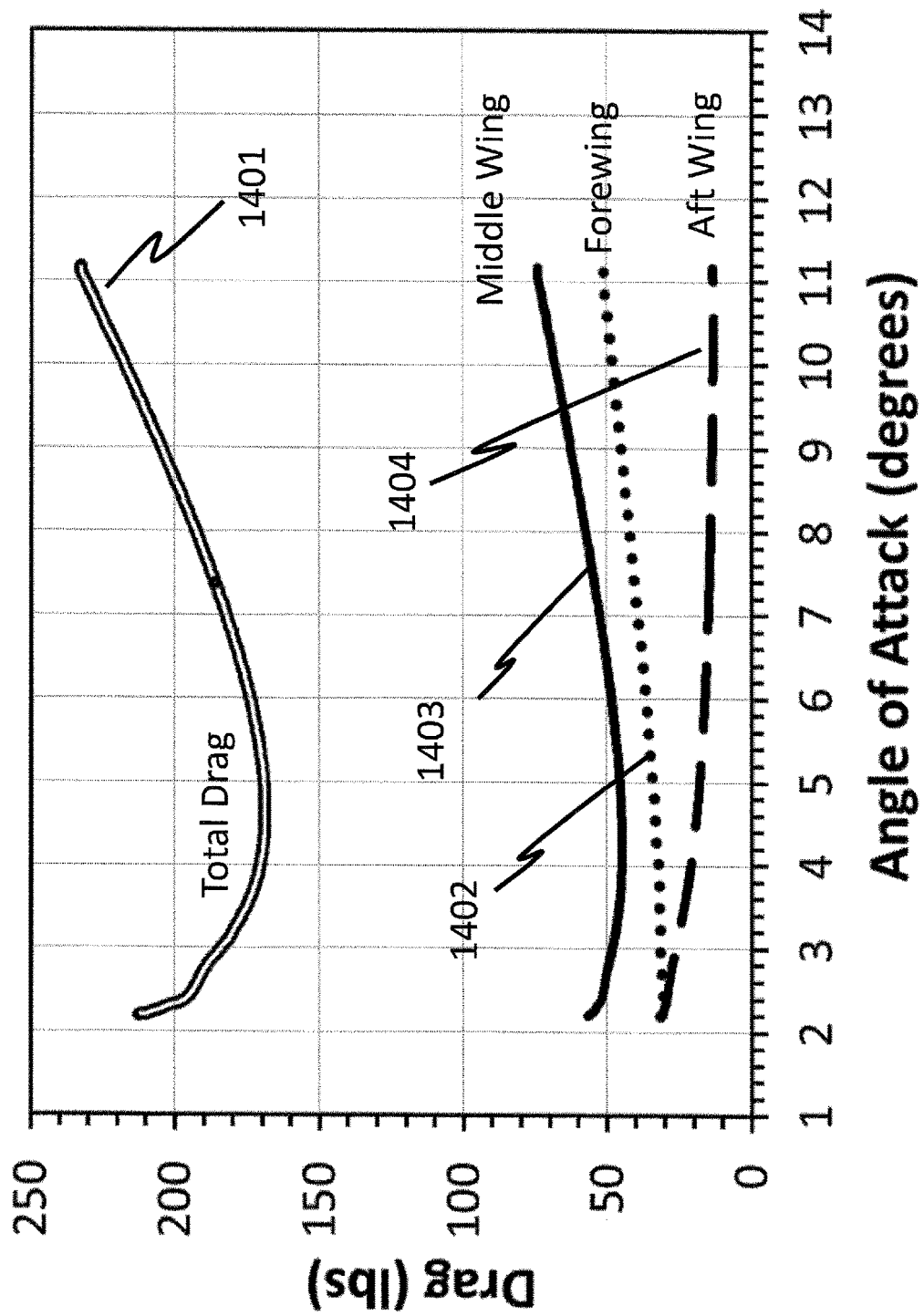
FIG. 15 is a plot of data derived from computational simulations performed with X-Plane, where the total drag generated and drag generated by each of the three wings is a function of angle of attack.

FIG. 15 depicts a plot of total drag generated, and drag generated by each of the three wings as a function of angle of attack, calculated from a computational simulation performed with X-Plane, of the tandem wing aircraft depicted in FIGS. 9-10, during which the aircraft's engine power was quickly reduced from 100% to 0%, and the aircraft's altitude was maintained near 10,000 feet.

Figure 16:
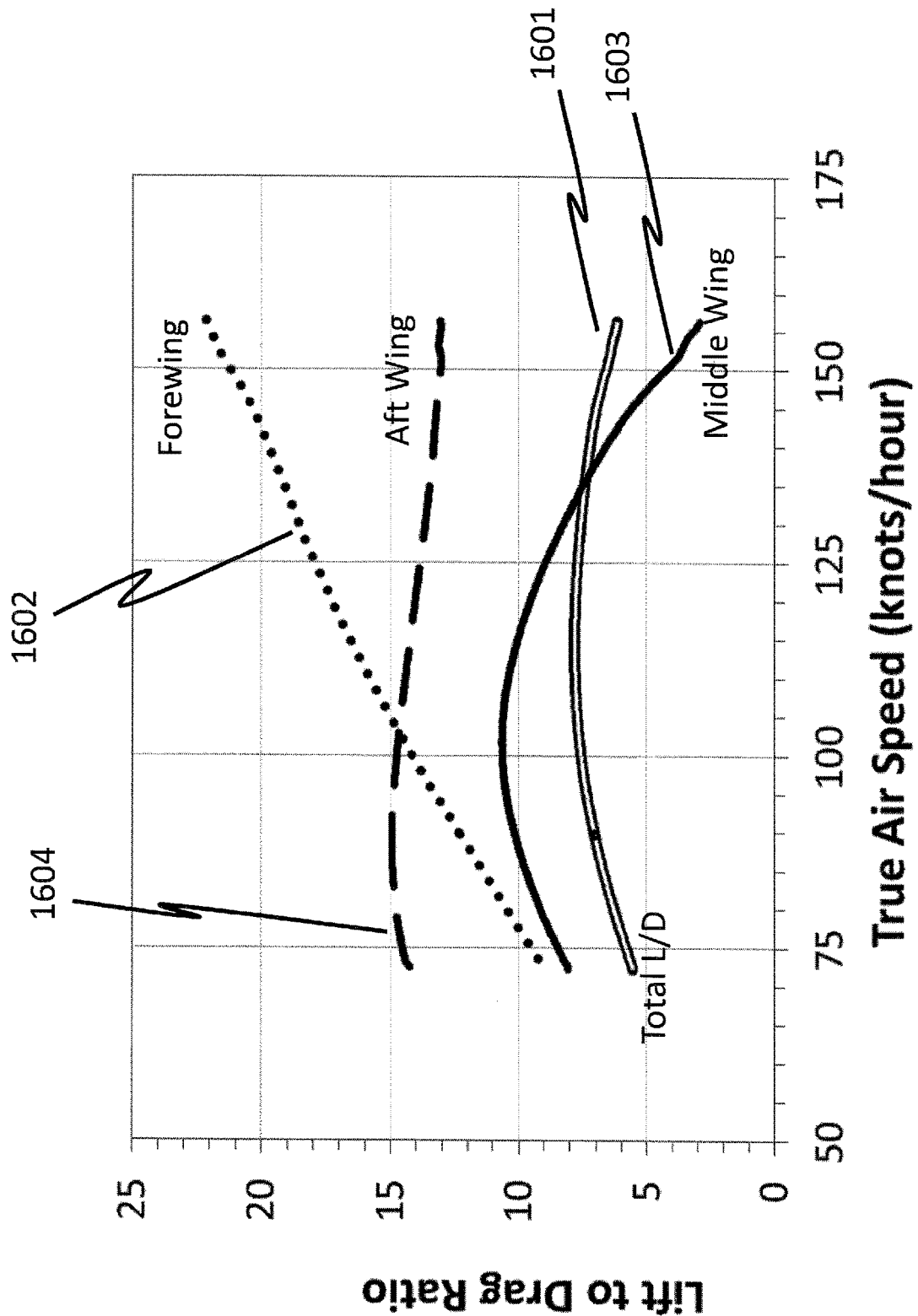
FIG. 16 is a plot of data derived from computational simulations performed with X-Plane, where the total lift to drag ratio of the entire aircraft and lift to drag ratios of each of the three wings is a function of true air speed.

FIG. 16 depicts a plot of total lift to drag ratio of the entire aircraft, and lift to drag ratios of each of the three wings as a function of true air speed, calculated from a computational simulation performed with X-Plane, of the tandem wing aircraft depicted in FIGS. 9-10, during which the aircraft's engine power was quickly reduced from 100% to 0%, and the aircraft's altitude was maintained near 10,000 feet.

Figure 17:
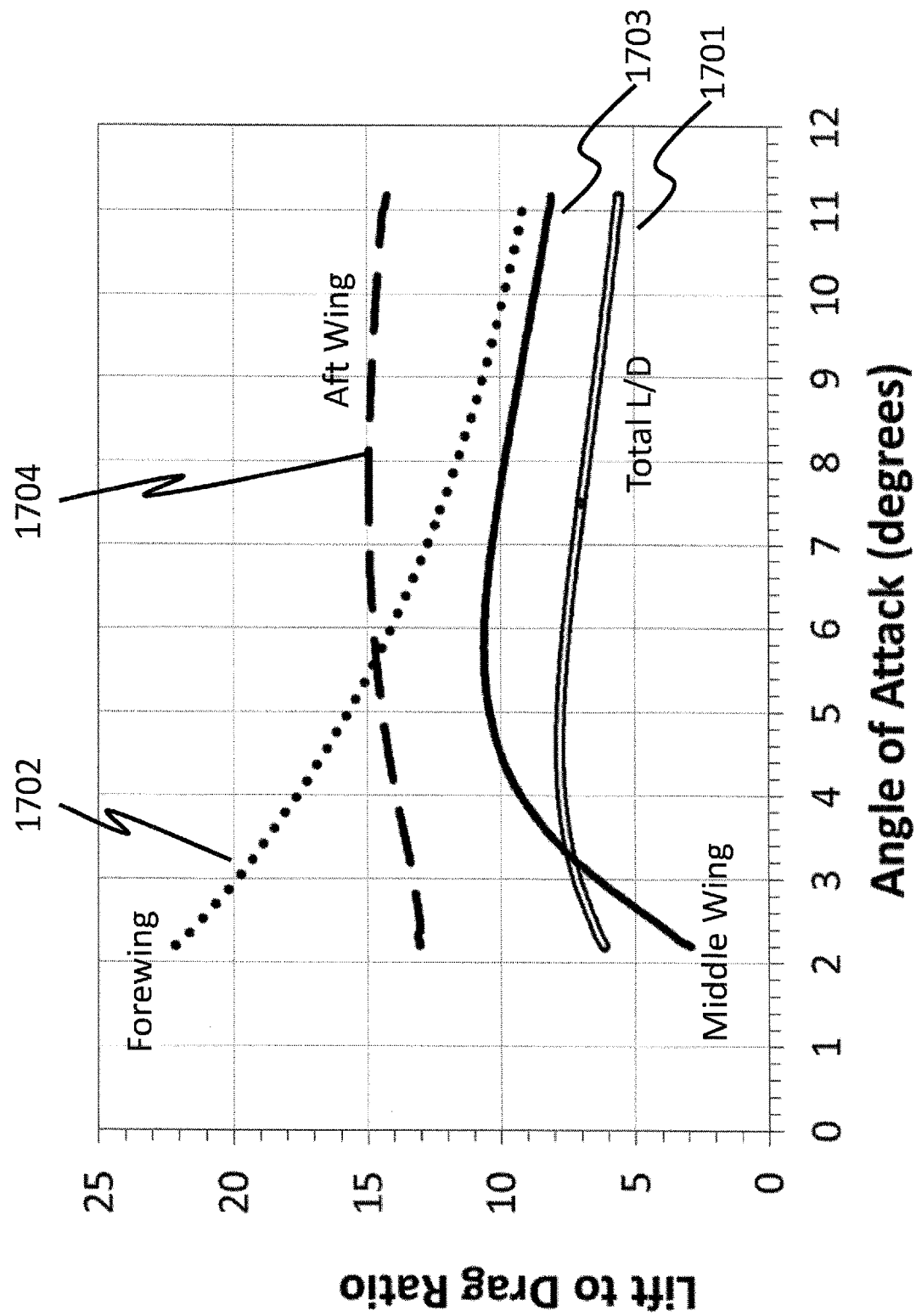
FIG. 17 is a plot of data derived from computational simulations performed with X-Plane, where the total lift to drag ratio of the entire aircraft, and lift to drag ratios of each of the three wings is a function of angle of attack.

FIG. 17 depicts a plot of total lift to drag ratio of the entire aircraft, and lift to drag ratios of each of the three wings as a function of angle of attack, calculated from a computational simulation performed with X-Plane, of the tandem wing aircraft depicted in FIGS. 9-10, during which the aircraft's engine power was quickly reduced from 100% to 0%, and the aircraft's altitude was maintained near 10,000 feet.

Figure 18:
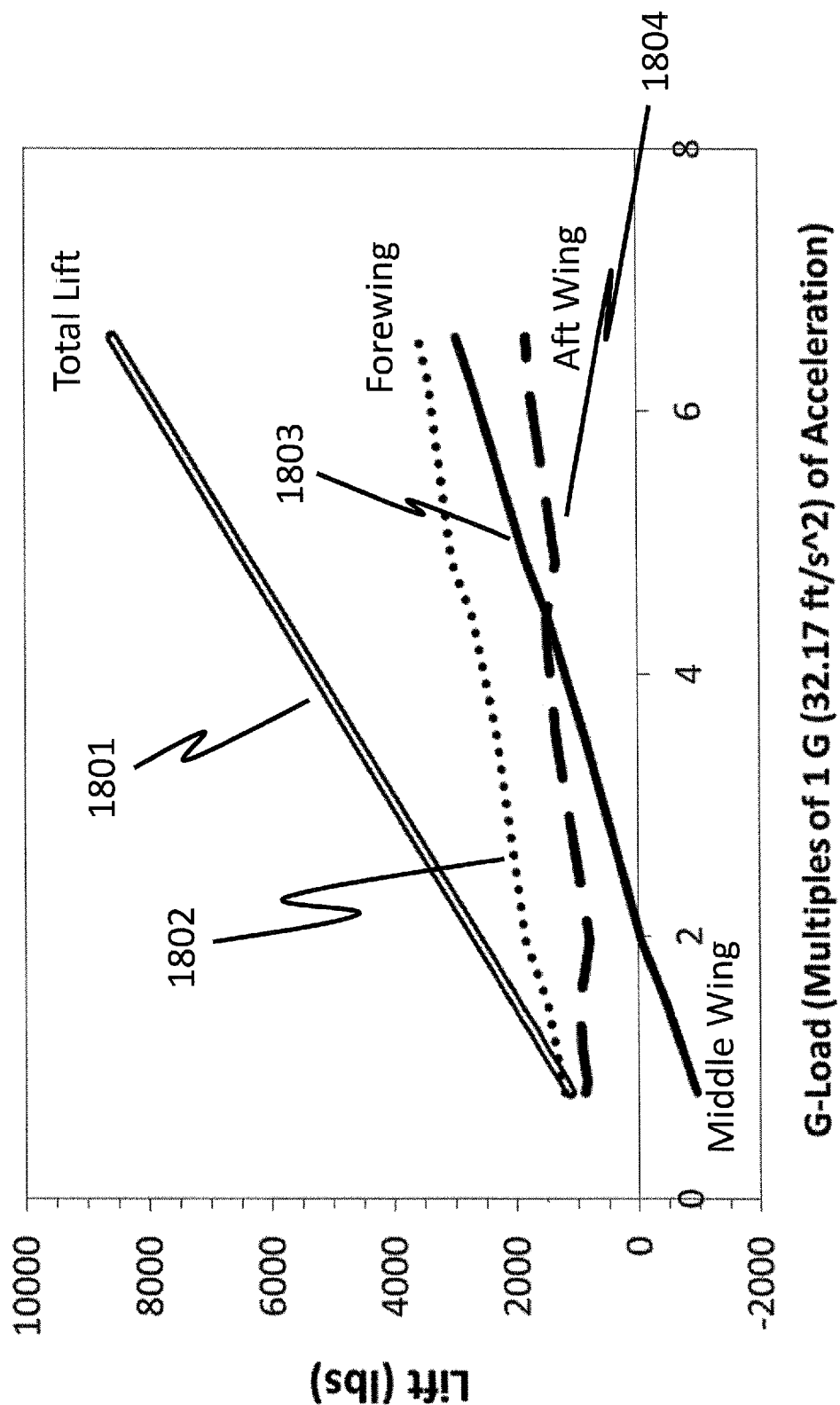
FIG. 18 is a plot of data derived from computational simulations performed with X-Plane, where the total lift generated and lift generated by each of the three wings is a function of g-loading.

For FIG. 18, the X-Plane simulation is for a plane pulling out of a steep dive, generating high-G's. FIG. 18 depicts a plot of total lift generated and lift generated by each of the three wings as a function of g-loading, calculated from a computational simulation performed with X-Plane, of the tandem wing aircraft depicted in FIGS. 9-10, during which the aircraft is pulling out of a steep dive.

Figure 19:
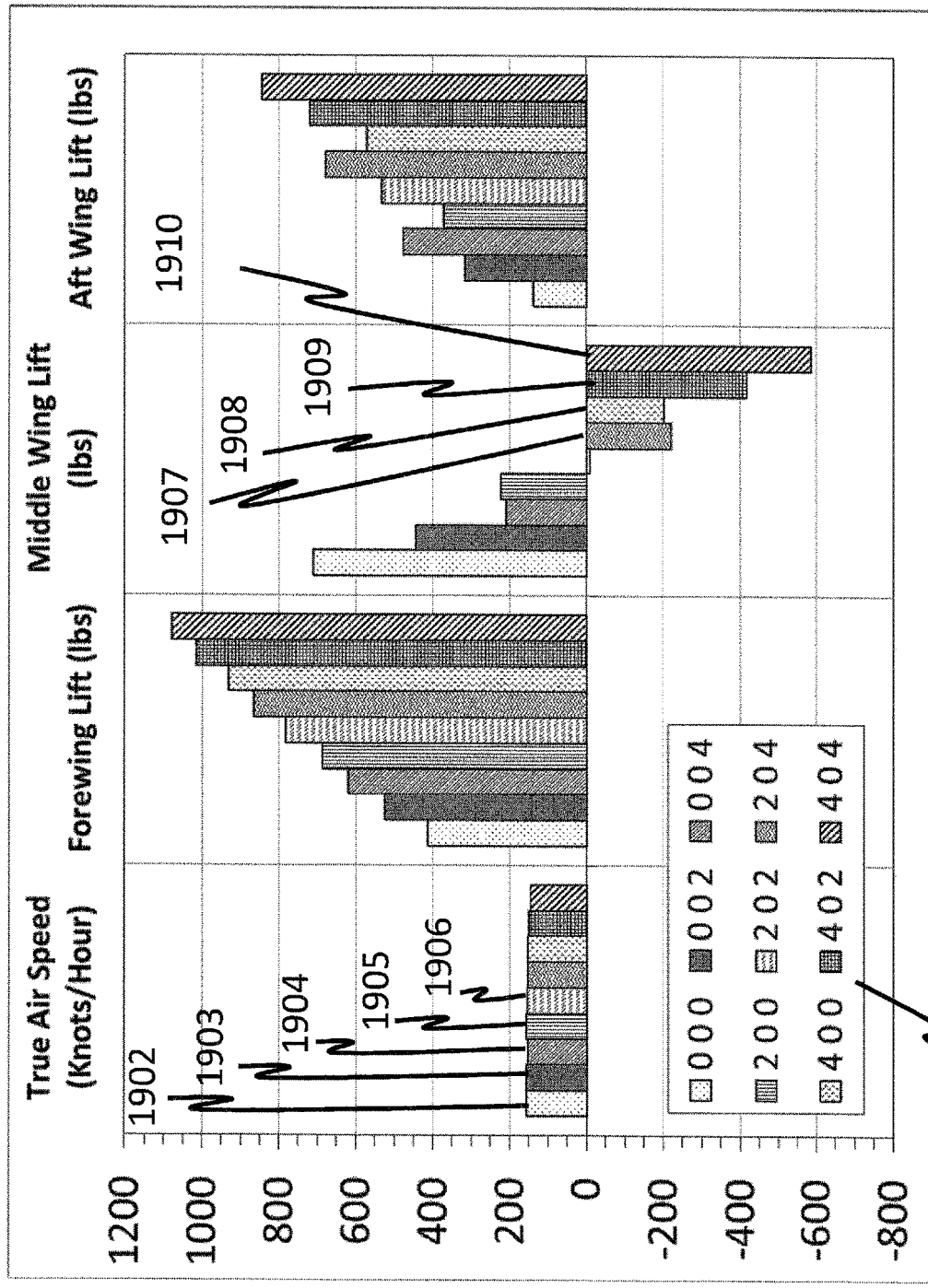
FIG. 19 is a bar graph derived from computational simulations performed with X-Plane, representing the true air speed and the lift generated by each of the three wings of different aircraft at high, constant speed during level flight.

FIG. 19 is a constant speed plot that depicts a bar graph representing data generated by a computational simulation performed with X-Plane. The first through ninth columns of each of the four sections of the bar graph represent data from aircraft similar to the aircraft depicted in FIGS. 9-10, but with the angle of incidence of each of the three wings varying slightly for each aircraft. The data depicted are the true air speed, and the lift generated by each of the three wings of each aircraft, all recorded at the maximum speed during level flight for each aircraft.

The legend 1901 shown in FIG. 19 shows how each of the 9 column categories of data correspond to different combinations of AOIs of the fore, middle, and aft wings. For example, the sixth entry in the legend (2,0,4) corresponds to a fore wing AOI of 2.0 degrees, a middle wing AOI of 0.0 degrees, and an aft wing AOI of 4.0 degrees. This specific combination corresponds to column 1907 in FIG. 19. From FIG. 19 it is apparent that by adjusting the AOI 601 of forewing 701 and aft wing 703, the lift and wing loading for each of the three wings can be varied according to need. For example, a fore wing AOI of 2.0 degrees, a middle wing AOI of 0.0 degrees, and an aft wing AOI of 2.0 degrees, corresponding to the column data 1906, shows the lowest middle wing loading at high speed cruising flight of the combinations tested in FIG. 19.

FIGS. 20-24 are plots showing lift and vertical velocity during a climb. These plots show the performance of the plane during a climb at 100% power.

Figure 20:
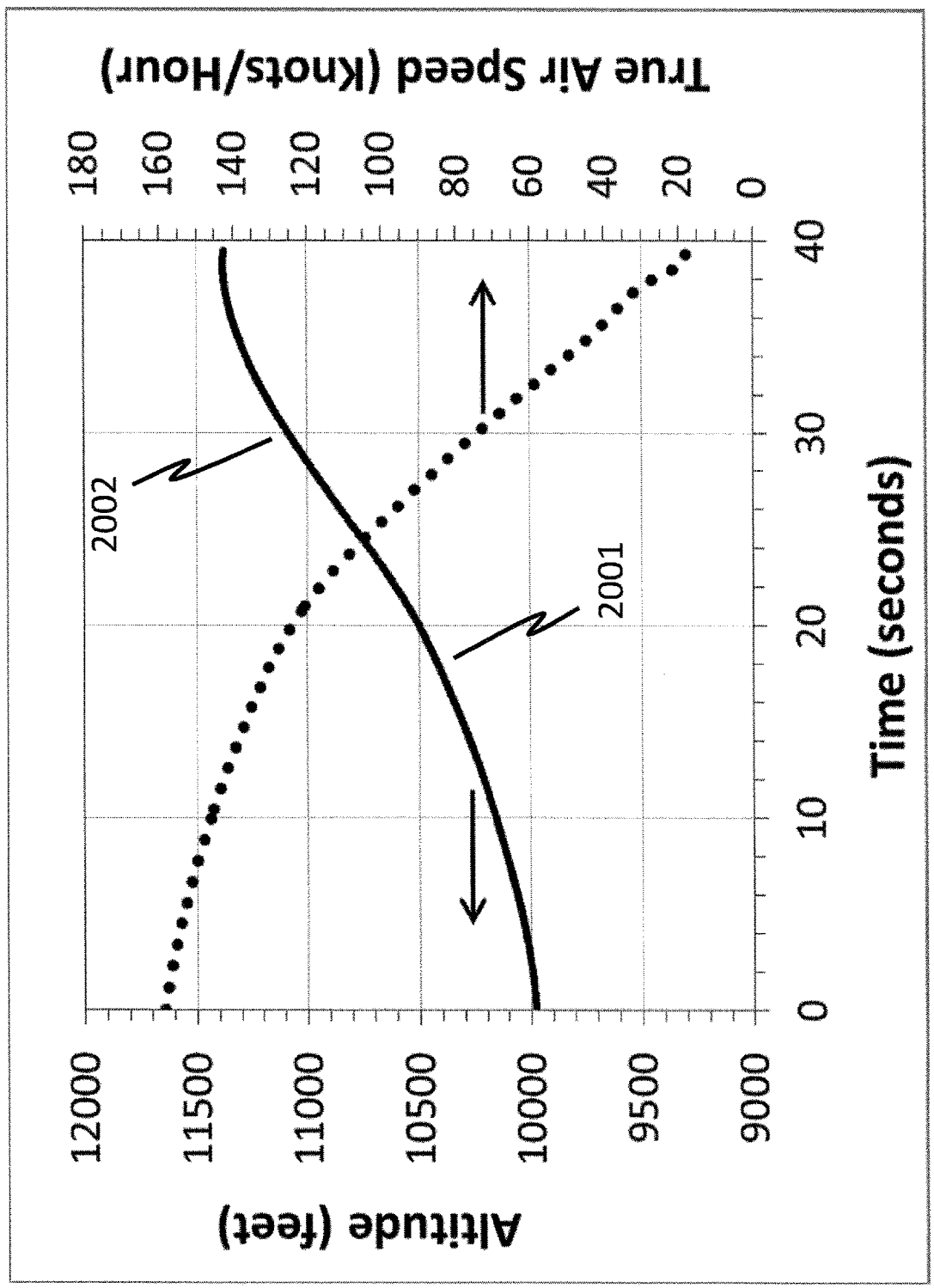
FIG. 20 is a plot of data derived from computational simulations performed with X-Plane, where the altitude and true air speed is a function of time.

FIG. 20 depicts a plot of the altitude and true air speed as a function of time, calculated from a computational simulation performed with X-Plane, of a tandem wing aircraft depicted in FIGS. 9-10, during which the aircraft's engine power was maintained at 100%, and a climb was carried out, increasing altitude as quickly as possible and for as long as possible.

Figure 21:
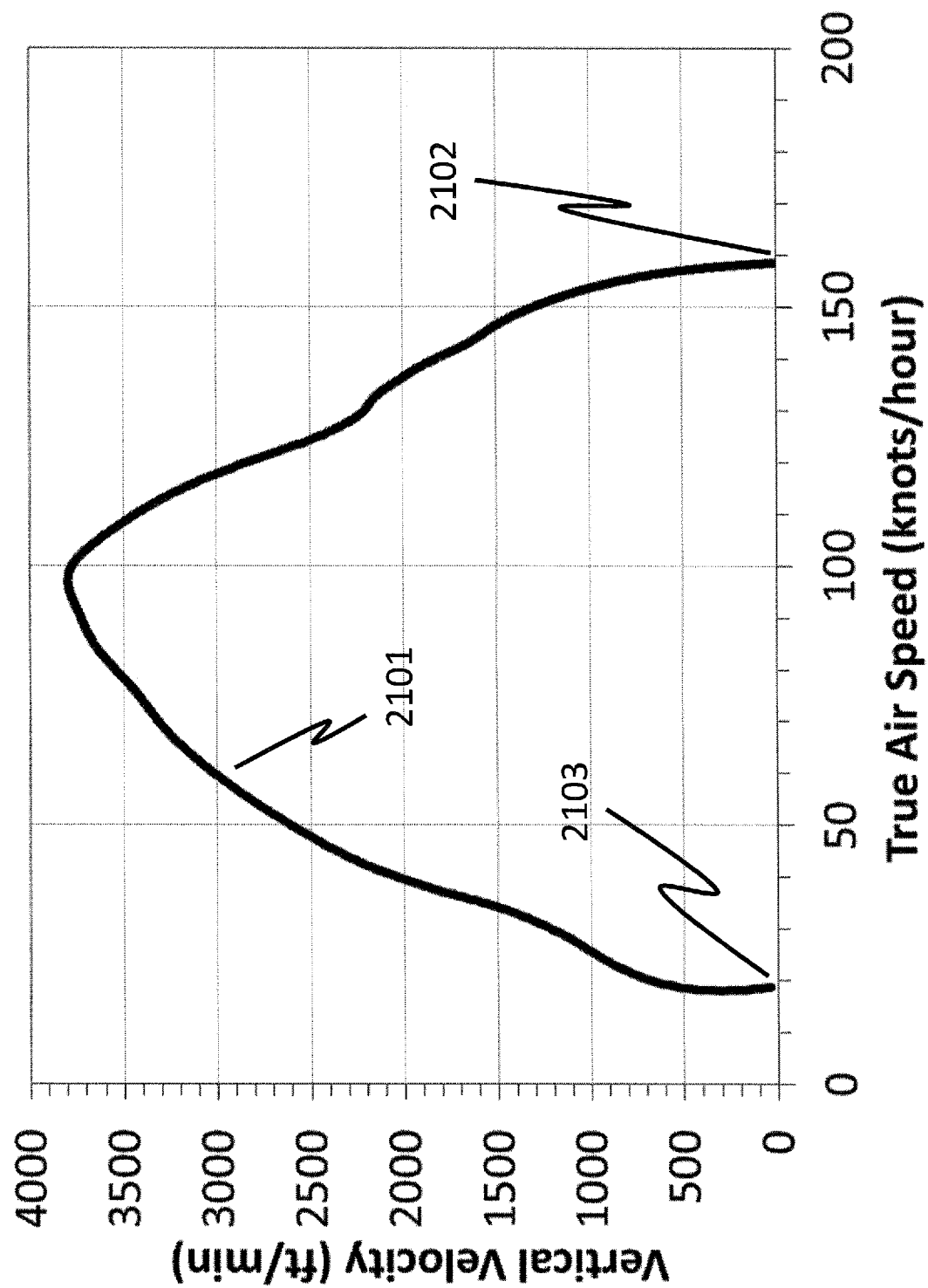
FIG. 21 is a plot of data derived from computational simulations performed with X-Plane, where the vertical velocity of the aircraft is a function of true air speed.

FIG. 21 depicts a plot of the vertical velocity of the aircraft as a function of true air speed, calculated from a computational simulation performed with X-Plane, of a tandem wing aircraft depicted in FIGS. 9-10, during which the aircraft's engine power was maintained at 100%, and a climb was carried out, increasing altitude as quickly as possible and for as long as possible.

Figure 22:
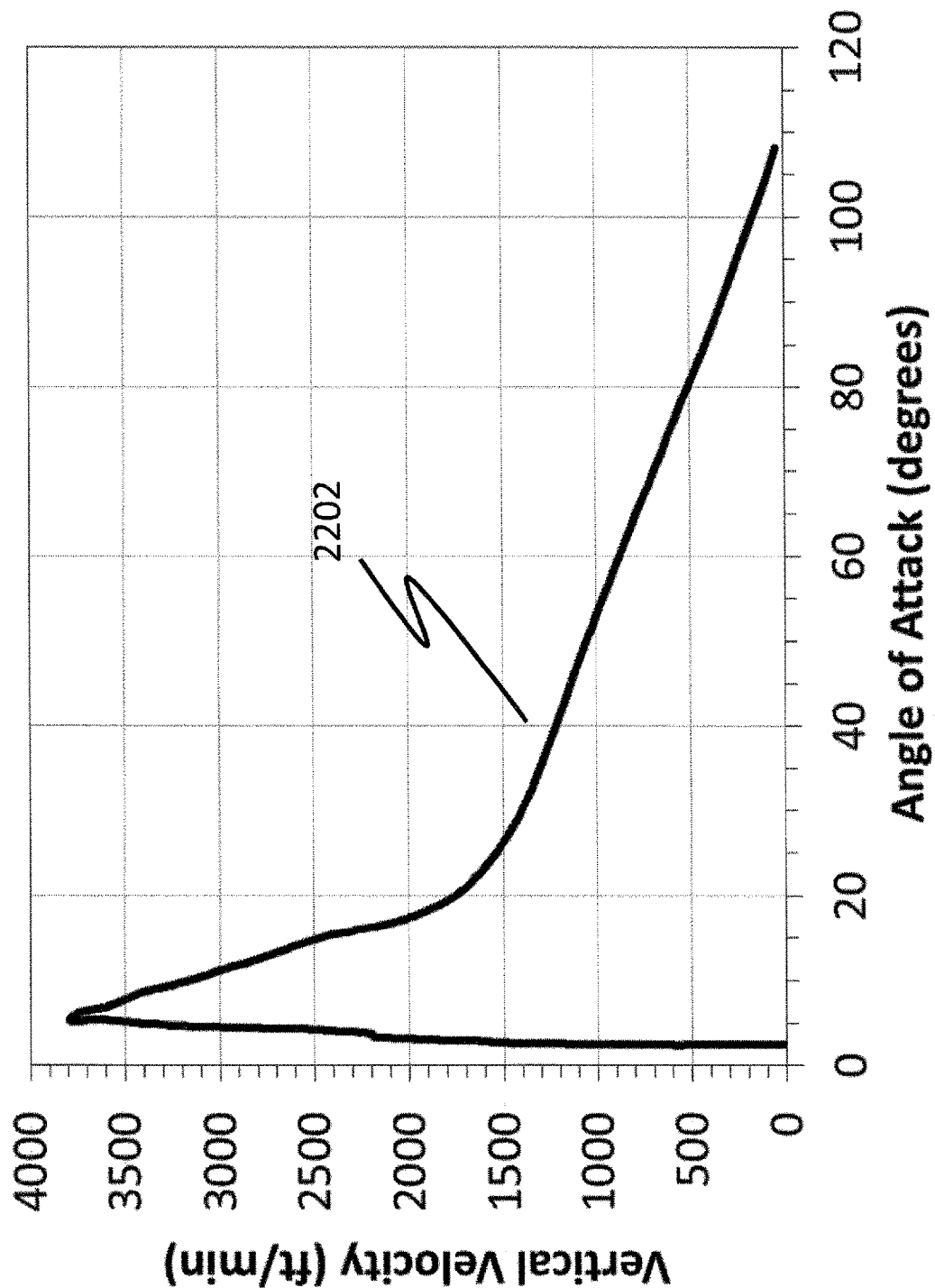
FIG. 22 is a plot of data derived from computational simulations performed with X-Plane, where the vertical velocity of the aircraft is a function of angle of attack.

FIG. 22 depicts a plot of the vertical velocity of the aircraft as a function of angle of attack, calculated from a computational simulation performed with X-Plane, of a tandem wing aircraft depicted in FIGS. 9-10, during which the aircraft's engine power maintained at 100%, and a climb was carried out, increasing altitude as quickly as possible and for as long as possible.

Figure 23:
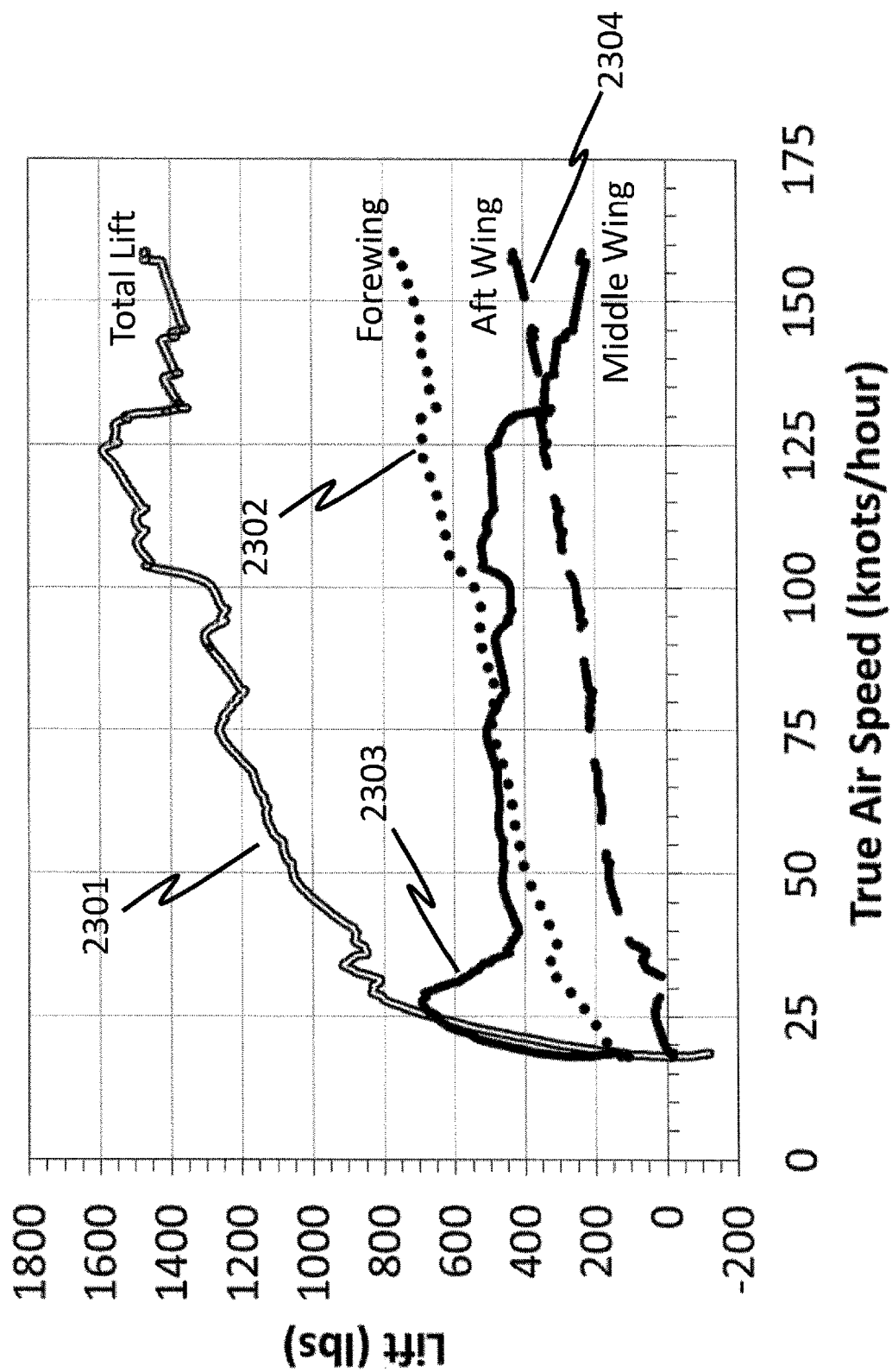
FIG. 23 is a plot of data derived from computational simulations performed with X-Plane, where the total lift generated and lift generated by each of the three wings is a function of true air speed.

FIG. 23 depicts a plot of total lift generated and lift generated by each of the three wings as a function of true air speed, calculated from a computational simulation performed with X-Plane, of a tandem wing aircraft depicted in FIGS. 9-10, during which the aircraft's engine power maintained at 100%, and a climb was carried out, increasing altitude as quickly as possible and for as long as possible.

Figure 24:
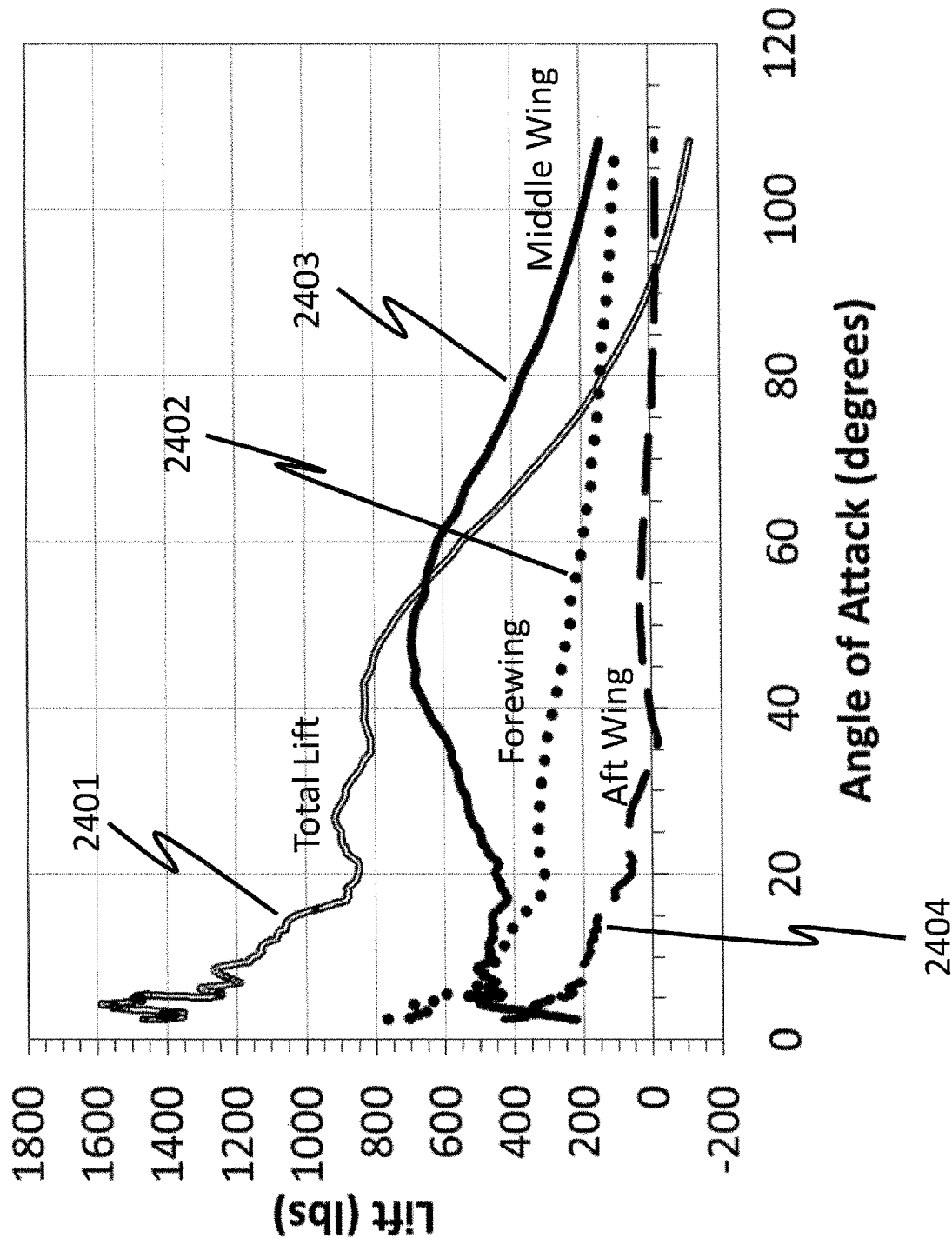
FIG. 24 is a plot of data derived from computational simulations performed with X-Plane, where the total lift generated and lift generated by each of the three wings is a function of angle of attack.

FIG. 24 depicts a plot of total lift generated and lift generated by each of the three wings as a function of angle of attack, calculated from a computational simulation performed with X-Plane, of a tandem wing aircraft depicted in FIG. 9 and FIG. 10, during which the aircraft's engine power maintained at 100%, and a climb was carried out, increasing altitude as quickly as possible, and for as long as possible.

FIGS. 25-30 are plots showing performance of a tandem wing aircraft during a controlled descent to the ground at a very high AOA. Specifically, these plots show the performance of the plane after an unsuccessful attempt to stall the aircraft at 10,000 feet, followed by a controlled descent to the ground at a very high AOA.

Figure 25:
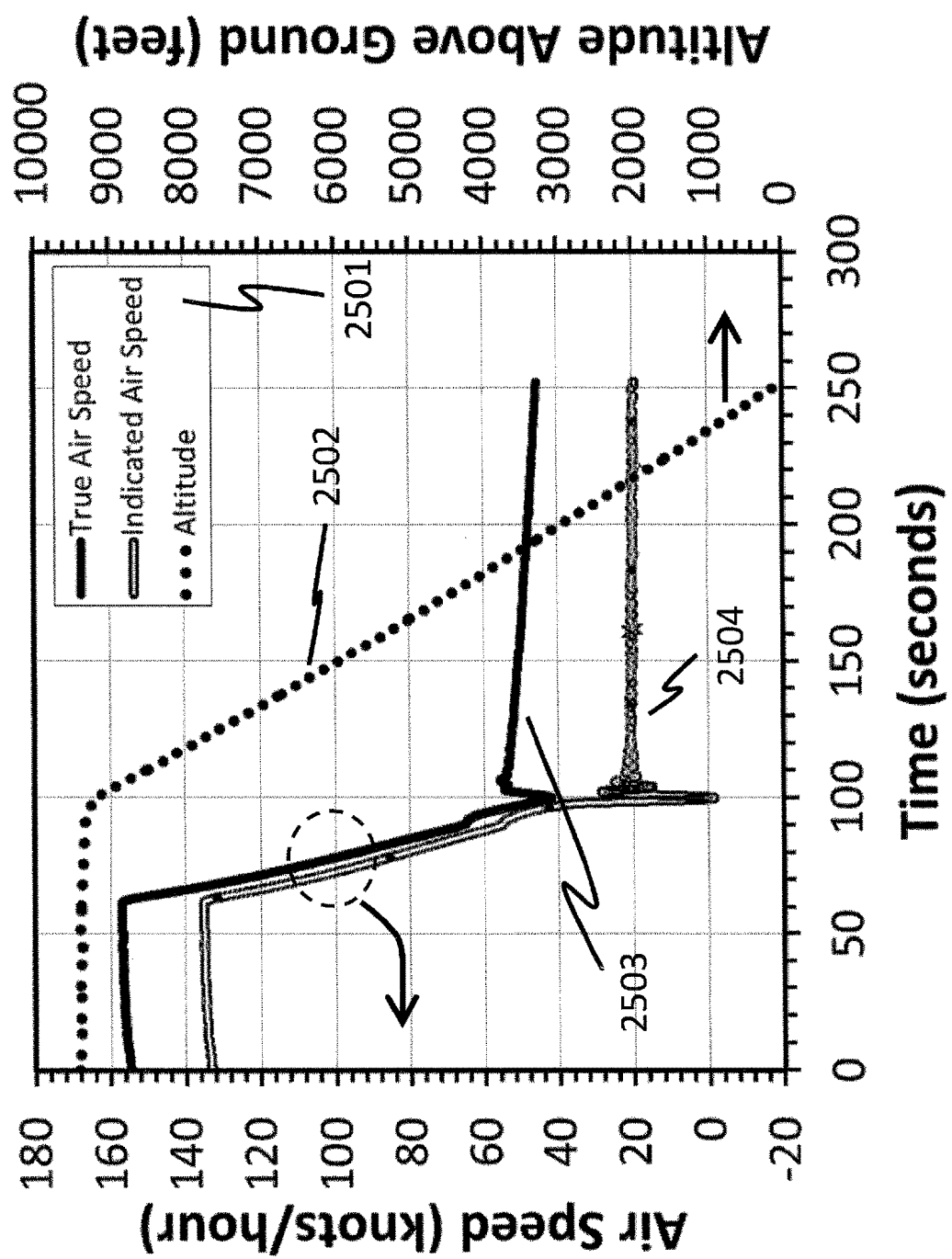
FIG. 25 is a plot of data derived from computational simulations performed with X-Plane, depicting the true air speed, indicated air speed, and altitude above ground level versus time.

FIG. 25 depicts the true air speed, indicated air speed, and altitude above ground level, calculated from a computational simulation performed with X-Plane, of a tandem wing aircraft depicted in FIGS. 9-10, first showing an unsuccessful attempt to induce a stall in which the AOA of the aircraft reached >90 degrees, followed by a tail slide of the aircraft, followed by a stable, controlled descent to ground at an AOA of approximately 65 degrees, during which maximum pitch-up was maintained throughout the simulation.

Figure 26:
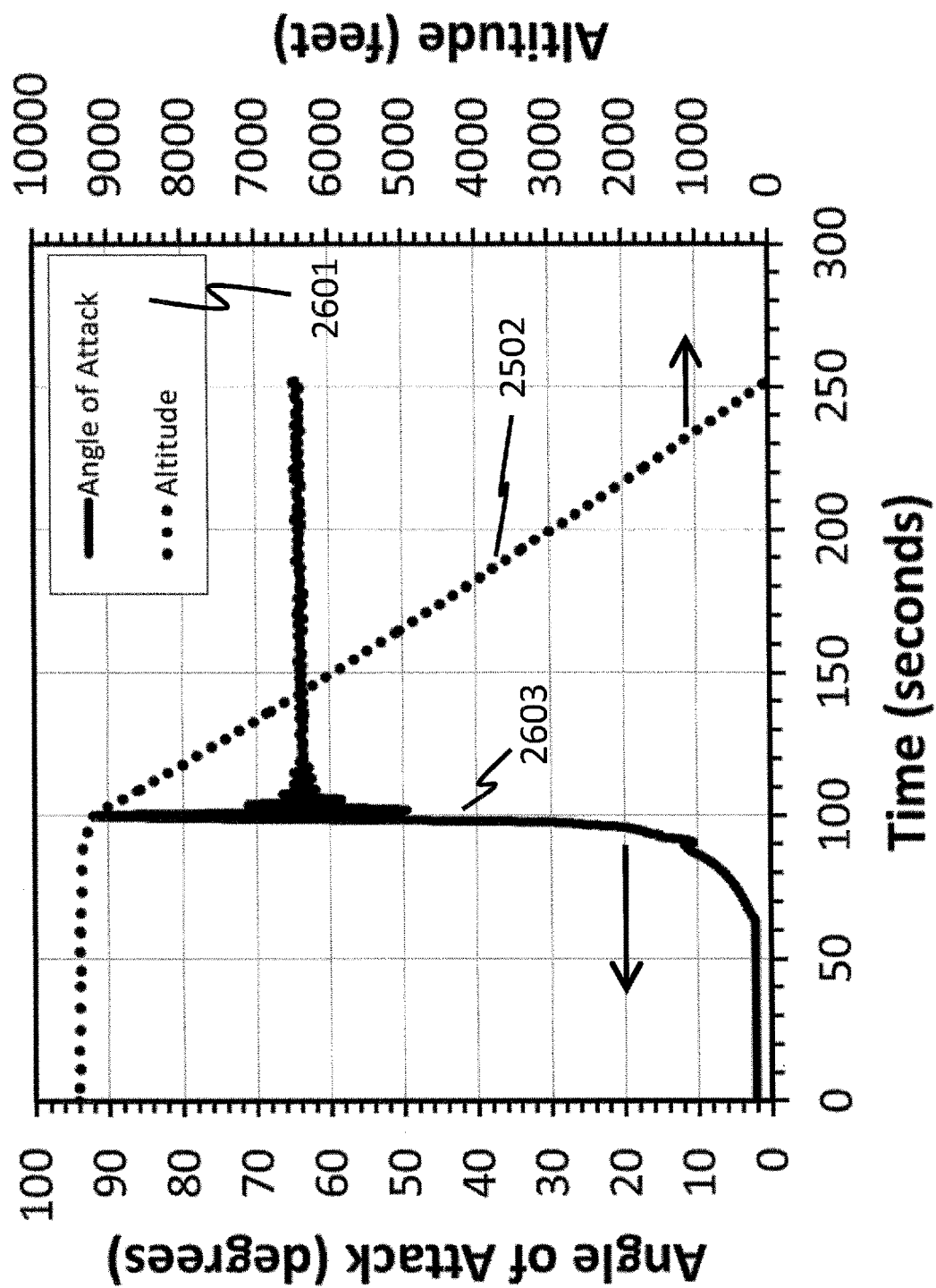
FIG. 26 is a plot of data derived from computational simulations performed with X-Plane, depicting the angle of attack and altitude above ground level versus time.

FIG. 26 depicts the angle of attack and altitude above ground level, calculated from a computational simulation performed with X-Plane, of a tandem wing aircraft depicted in FIGS. 9-10, first showing an unsuccessful attempt to induce a stall in which the AOA of the aircraft reached >90 degrees, followed by a tail slide of the aircraft, followed by a stable, controlled descent to ground at an AOA of approximately 65 degrees, during which maximum pitch-up was maintained throughout the simulation.

Figure 27:
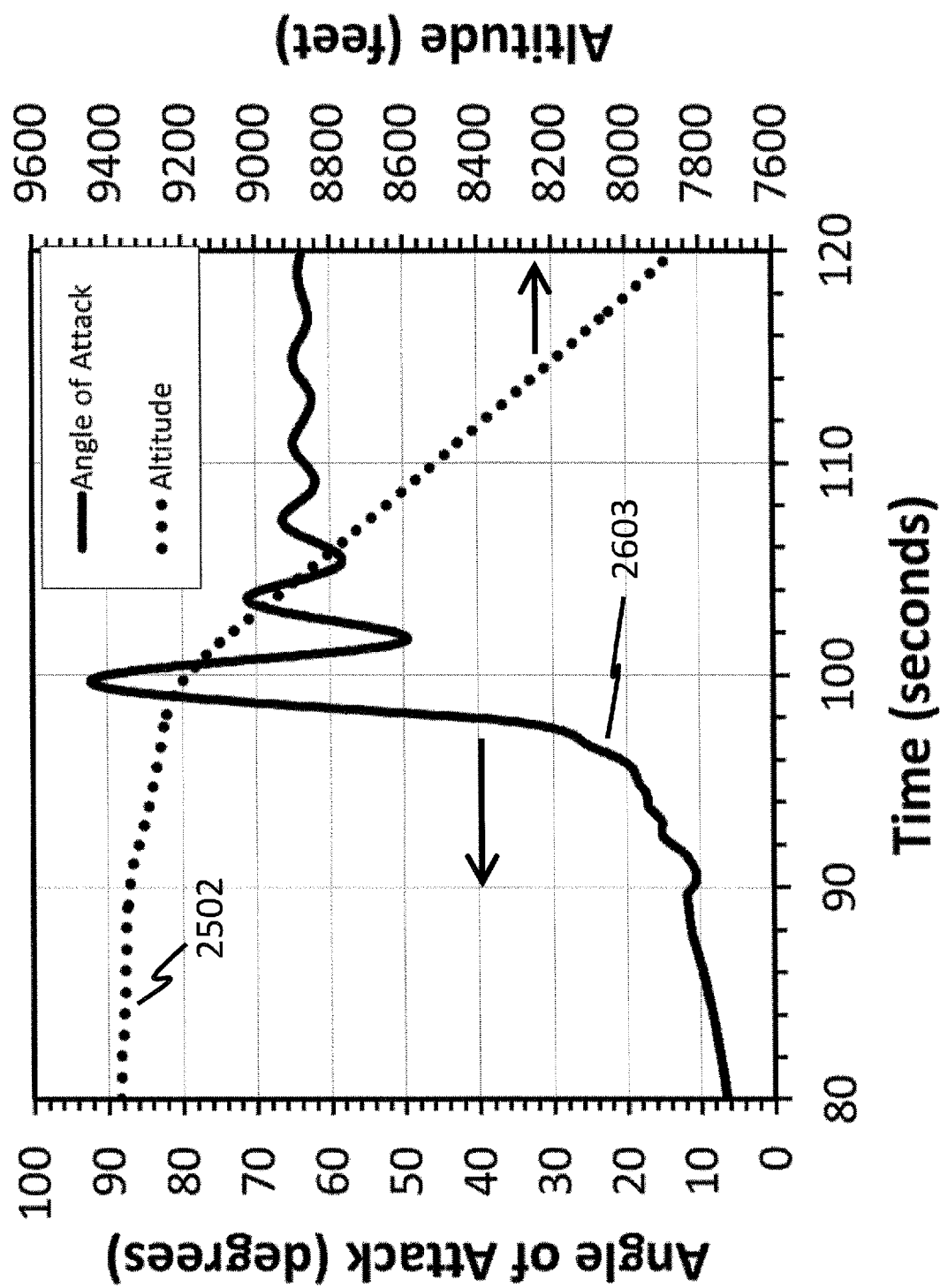
FIG. 27 is a plot of data derived from computational simulations performed with X-Plane, depicting the angle of attack and altitude above ground level versus time.

FIG. 27 depicts the angle of attack and altitude above ground level, calculated from a computational simulation performed with X-Plane, of a tandem wing aircraft depicted in FIGS. 9-10, during an unsuccessful attempt to induce a stall in which the AOA of the aircraft reached >90 degrees, followed by a tail slide of the aircraft, followed by a stabilized, controlled descent to ground at an AOA of approximately 65 degrees, during which maximum pitch-up was maintained throughout the simulation.

Figure 28:
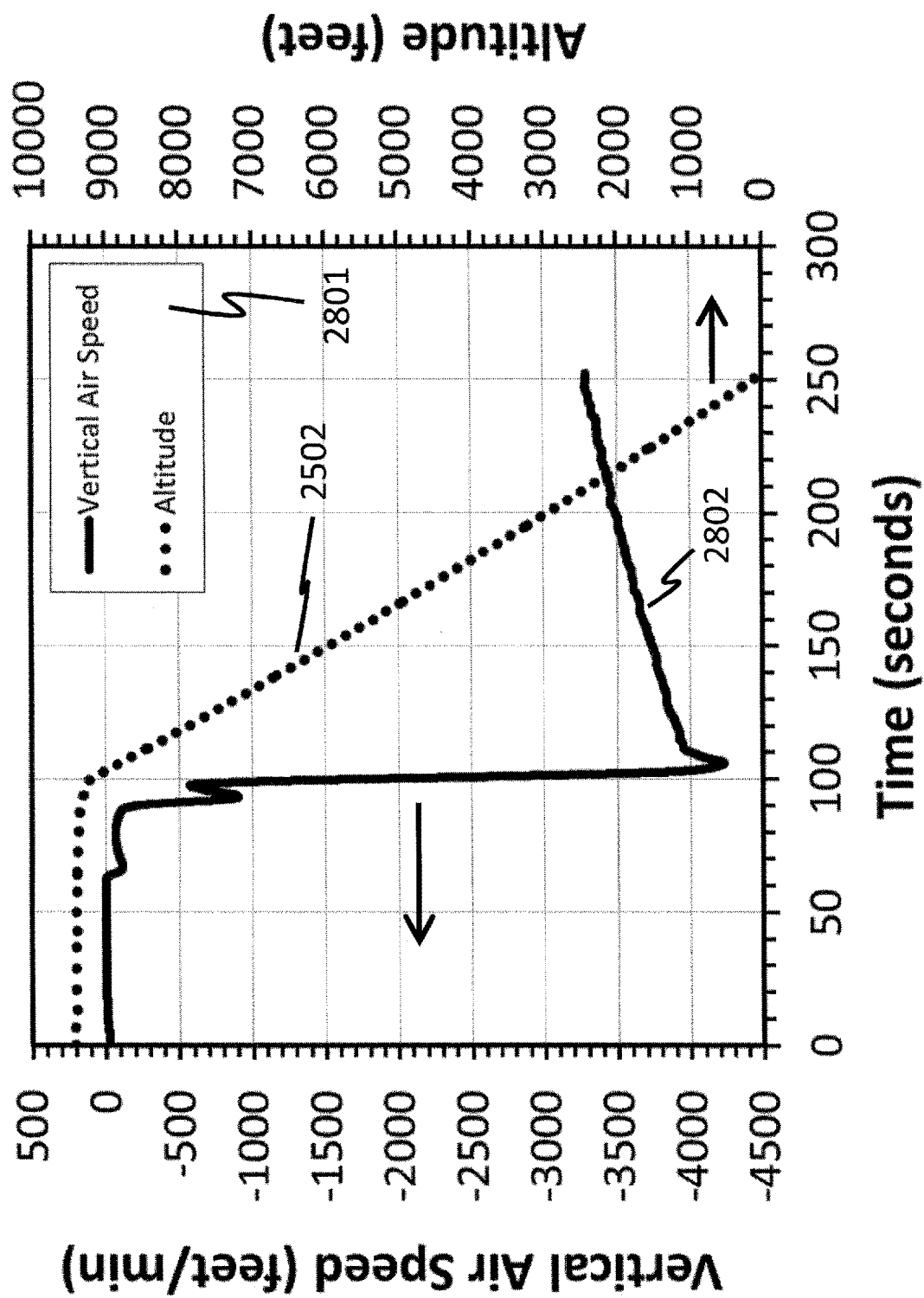
FIG. 28 is a plot of data derived from computational simulations performed with X-Plane, depicting the vertical air speed and altitude above ground level versus time.

FIG. 28 depicts the vertical air speed and altitude above ground level, calculated from a computational simulation performed with X-Plane, of a tandem wing aircraft depicted in FIGS. 9-10, first showing an unsuccessful attempt to induce a stall in which the AOA of the aircraft reached >90 degrees, followed by a tail slide of the aircraft, followed by a stable, controlled descent to ground at an AOA of approximately 65 degrees, during which maximum pitch-up was maintained throughout the simulation.

Figure 29:
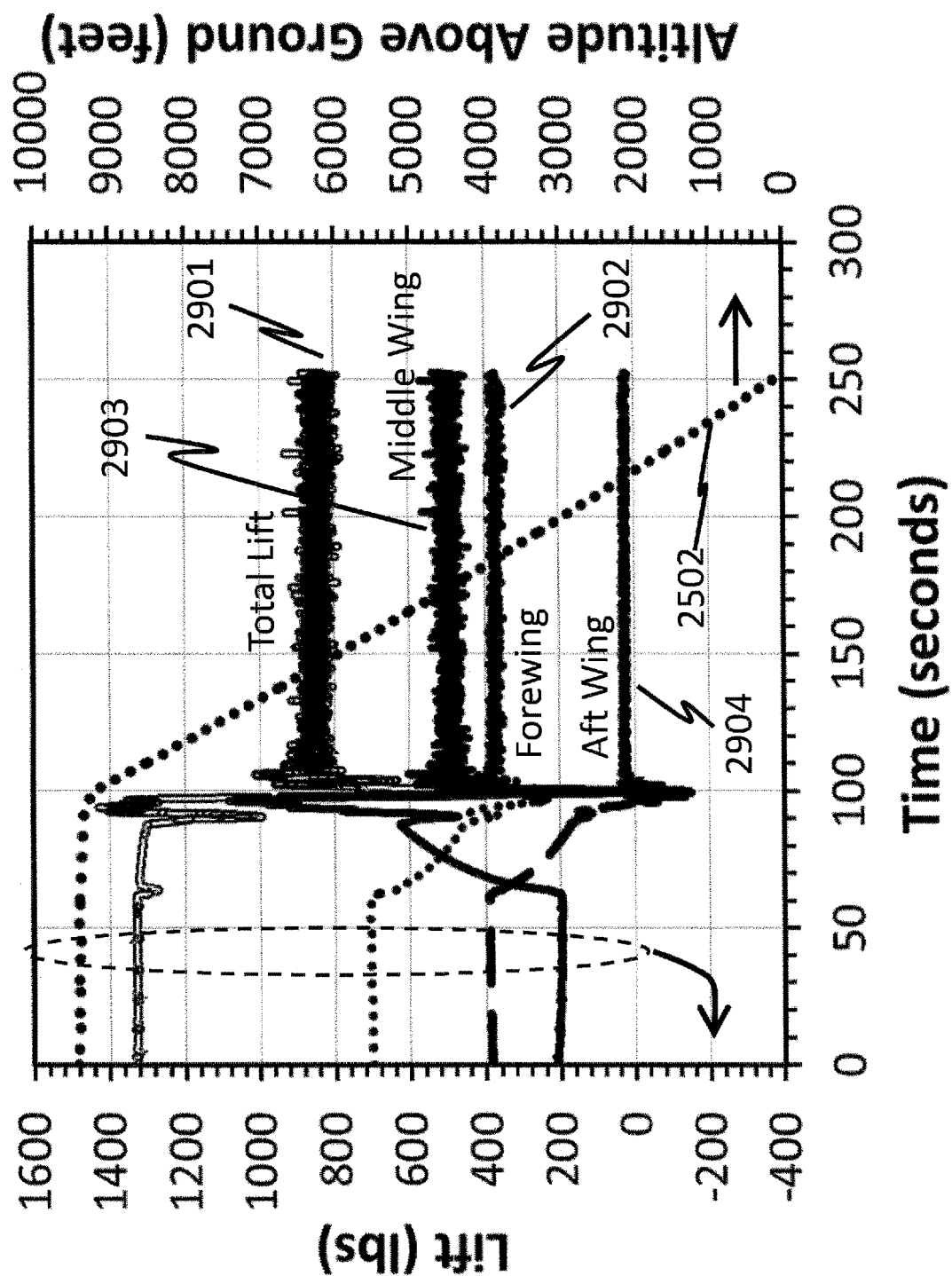
FIG. 29 is a plot of data derived from computational simulations performed with X-Plane, depicting the total lift generated, lift generated by each of the three wings, and altitude above ground level versus time.

FIG. 29 depicts the total lift generated, lift generated by each of the three wings, and altitude above ground level, calculated from a computational simulation performed with X-Plane, of a tandem wing aircraft depicted in FIGS. 9-10, first showing an unsuccessful attempt to induce a stall in which the AOA of the aircraft reached >90 degrees, followed by a tail slide of the aircraft, followed by a stable, controlled descent to ground at an AOA of approximately 65 degrees, during which maximum pitch-up was maintained throughout the simulation.

Figure 30:
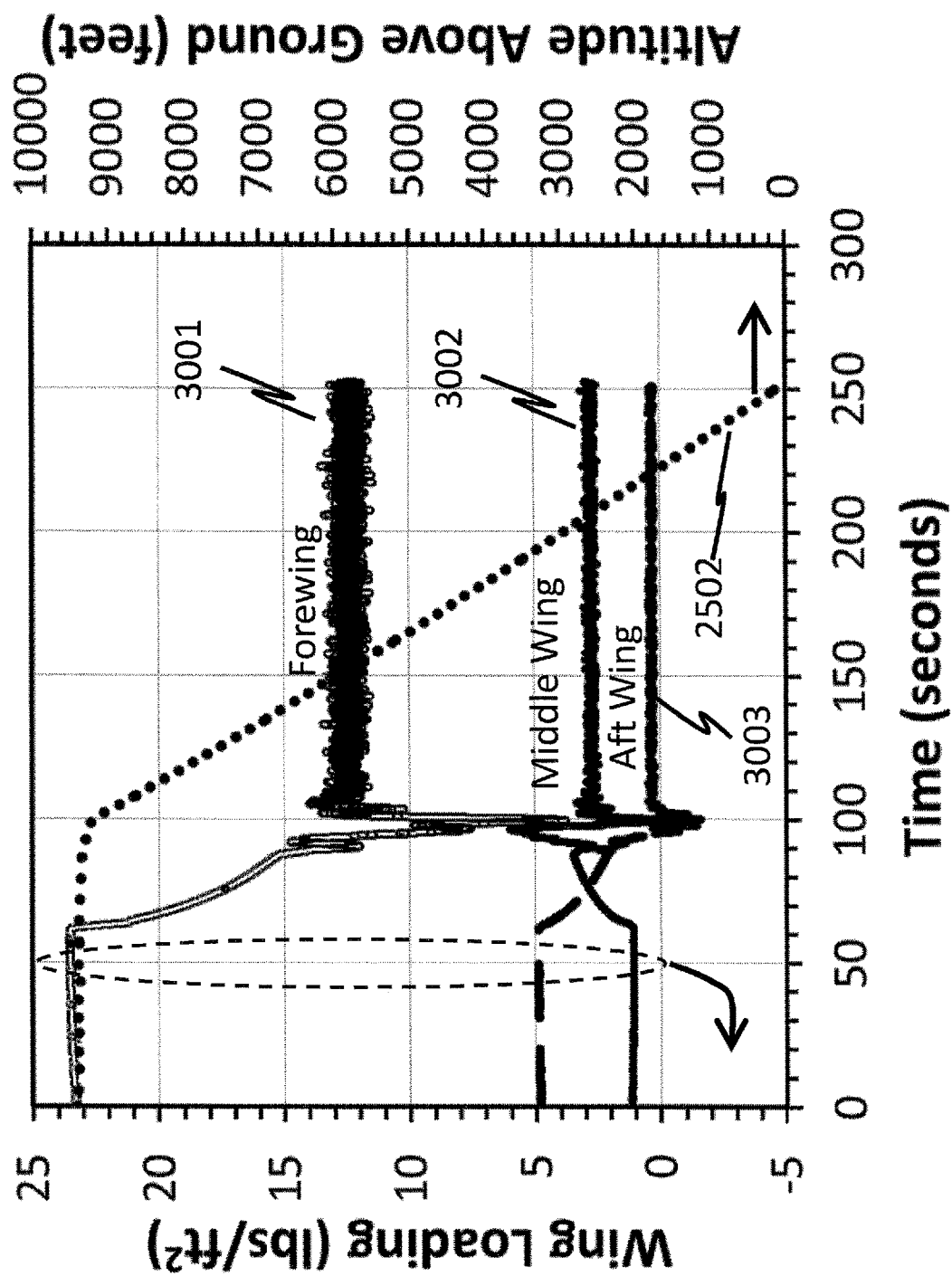
FIG. 30 is a plot of data derived from computational simulations performed with X-Plane, depicting the wing loading of each of the three wings and altitude above ground level versus time.

FIG. 30 depicts the wing loading of each of the three wings and altitude above ground level, calculated from a computational simulation performed with X-Plane, of a tandem wing aircraft depicted in FIGS. 9-10, first showing an unsuccessful attempt to induce a stall in which the AOA of the aircraft reached >90 degrees, followed by a tail slide of the aircraft, followed by a stable, controlled descent to ground at an AOA of approximately 65 degrees, during which maximum pitch-up was maintained throughout the simulation.

As discussed in above, various embodiments of the present disclosure are directed to an airplane design that allows for high speed and low speed flight regimes by passively varying the relative individual contributions of three or more tandem wings.

Some embodiments include a method and design for an aircraft with three or more wings in tandem configuration (e.g., fore, middle, and aft wings), where any of the wings may consist of a winged body or fuselage-wing combination and the middle wing(s) is positioned with its zero lift line parallel or close to parallel to the longitudinal axis of the aircraft.

In some embodiments, the design of the aircraft as described herein eliminates the need for any moving parts to vary the functioning wing area and wing loading during transitions from low speed flight to high speed flight and vice versa.

Additionally, in various embodiments, at high speeds the middle wing or wing body contributes little or no lift to the total lift of the aircraft during high speed flight, but contributes an increasing proportion of the total lift of the aircraft as the aircraft slows.

In some embodiments, aircraft flight safety is improved by removing the need to employ mechanical devices such as, but not limited to, leading and/or trailing edge flaps and/or slats during slow speed flight. In various embodiments, aircraft safety is improved due to lower takeoff and landing speeds.

In some embodiments, the middle wing or wings take the form of one or more winged bodies, and the designs of the winged bodies are optimized for absorbing kinetic energy, rendering the aircraft safer during crashes and/or high speed landings. In some embodiments, aircraft manufacturing is simplified due to the reduced parts count of the aircraft.

In some embodiments, takeoff and landing speeds are reduced due to significantly more available lift due to the inherent design of the aircraft then is available from the deployment of mechanical devices such as but not limited to leading and/or trailing edge flaps and slats. In various embodiments, the aircraft can be used for short takeoff or landing, including small airports with short runways, and aircraft carriers.

In some embodiments, the aircraft is intended for carrying high weight and/or high volume payloads with reduced overall wingspan. In some embodiments, the aircraft is designed to land and take off from water, and the landing gear takes the form of water skis and/or pontoons, and/or floats. In some embodiments, the aircraft is designed to land and take off from snow or ice, and the landing gear take the form of snow and/or ice skis.

Moreover, in some embodiments, the surface of the aircraft is designed and/or coated with materials designed to scatter, absorb, redirect, or otherwise interact with incident electromagnetic radiation in such a way so that the incident electromagnetic radiation is not reflected back to its source.

In various embodiments, the aircraft experiences a smoother ride during cruising flight due do relatively high wing loadings of the fore and aft wings at high speeds. In some embodiments, any of the three or more wings may have asymmetric top and bottom halves. In some embodiments, larger tandem wings enable a wider loading envelope.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

What is claimed is:

1. A tandem wing aircraft having a substantially zero lift line at a cruise speed, comprising:
 a fore wing mounted to the aircraft at an Angle of Incidence (AOI) F;
 an aft wing mounted to the aircraft at an AOI of A;
 a middle wing mounted to the aircraft between the fore and aft wings, and
 a mechanical device attached to the middle wing selectable to independently change the middle wing AOI during flight with an AOI of M, which is less than F and A, such that
 the middle wing AOI of M is approximately parallel to the zero lift line at said cruise speed and is different from F and A.

2. The aircraft of claim 1, wherein the fore, middle and aft wings have an Angle of Attack (AOA) in flight and wherein the middle wing AOI of M is selected such that at cruise speeds the middle wing Angle of Attack (AOA) less than the AOA of the fore or aft wings.

3. The aircraft of claim 1, wherein the middle wing has lift and drag in flight and wherein the middle wing AOI of M is selected such that at cruise speeds, the lift of the middle wing is minimized and the drag of the middle wing is minimized.

4. The aircraft of claim 1, wherein the middle wing has induced drag in flight and wherein the middle wing AOI of M is selected such that at cruise speeds the induced drag of the middle wing approaches zero (0).

5. The aircraft of claim 1, wherein the middle wing is a lifting body.

6. The aircraft of claim 1, wherein one or more of the fore or aft wings includes a mechanical device to change the AOI of the fore or aft wings at said cruise speed.

7. The aircraft of claim 1, wherein the middle wing has approximately zero (0) lift in flight at said cruise speed and wherein the middle wing AOI of M is selected to generate lift by the middle wing at low speeds less than said cruise speed.

8. A tandem wing aircraft wherein each wing has lift and drag in flight, comprising:
   a fore wing;
   an aft wing;
   a middle wing; and
   a mechanical device attached to the middle wing selectable to change the middle wing AOA during flight and operable to position
   the middle wing relative to the aircraft at a different Angle of Incidence (AOI) than the fore and aft wings at cruise speeds such that the lift generated by the middle wing at said cruise speed is approximately zero (0), minimizing lift and drag of the middle wing at cruise speeds and at low speeds the middle wing is independently selectable by the mechanical device to change the middle wing AOA to generate lift.

9. The aircraft of claim 8, wherein at cruise speeds, the Angle of Attack (AOA) of the middle wing results in approximately zero (0) induced drag of the middle wing.

10. The aircraft of claim 8, wherein at landing configuration speeds lift is generated by the fore, middle and aft wings and wherein the lift generated by the middle wing is greater than the lift generated by the fore wing or the aft wing.

11. A method of operating a tandem wing aircraft having a fore wing, an aft wing, and a middle wing each having an Angle of Attack (AOA) in flight, comprising:

positioning the middle wing between the fore and aft wings, the fore and aft wings having different AOA's in flight at a cruise speed;
positioning the middle wing relative to the aircraft using a mechanical device attached to the middle wing selectable to change the middle wing AOA during flight such that at said cruise speed, the AOA of the middle wing is approximately zero (0) and different from the fore and aft wing AOA.

12. The method of claim 11, the middle wing having induced drag in flight wherein the induced drag of the middle wing at cruise speeds is approximately zero (0).

13. The method of claim 11, wherein said mechanical device is selectable to change the AOA of the middle wing during flight independent of the fore or aft wings.

14. The method of claim 11, wherein said mechanical device is selectable to change the middle wing angle of incidence (AOI) during flight independent of any change of AOI of the fore or aft wing.

15. The method of claim 11, wherein one or more of the fore or aft wings have mechanical devices operable to selectively change the AOA of said one or more fore or aft wings during flight.

16. The method of claim 11, wherein a mechanical device is attached to the fore wing, and is selectable to change the AOA of the fore wing during flight.

17. The method of claim 11, wherein a mechanical device is attached to the aft wing, and is selectable to change the AOA of the aft wing during flight.

18. The method of claim 11, wherein the fore and aft wings include elevators, comprising positioning the fore and aft wings into a pitch up of the elevators and entering a controlled descent.

19. The method of claim 11, the aircraft having a center of gravity, including adjusting the AOA of the fore and aft wings to reposition the aircraft center of gravity fore and aft.

20. The method of claim 11, collecting solar energy through photovoltaic devices attached to one or more of the wings.

21. The method of claim 11, during cruise speeds the aircraft having high wing loading of the fore and aft wings.

* * * * *